US010291705B2

(12) United States Patent
Jung et al.

(10) Patent No.: US 10,291,705 B2
(45) Date of Patent: May 14, 2019

(54) SENDING INTERIM NOTIFICATIONS FOR NAMESPACE OPERATIONS FOR A DISTRIBUTED FILESYSTEM

(71) Applicant: Panzura, Inc., Campbell, CA (US)

(72) Inventors: Steve Hyuntae Jung, Saratoga, CA (US); Shishir Mondal, Sunnyvale, CA (US); John Richard Taylor, Tiburon, CA (US); Yun Lin, Bellevue, WA (US)

(73) Assignee: PANZURA, INC., Campbell, CA (US)

( * ) Notice: Subject to any disclaimer, the term of this patent is extended or adjusted under 35 U.S.C. 154(b) by 862 days.

(21) Appl. No.: 14/838,037

(22) Filed: Aug. 27, 2015

(65) Prior Publication Data

US 2016/0072888 A1 Mar. 10, 2016

Related U.S. Application Data

(63) Continuation-in-part of application No. 14/482,934, filed on Sep. 10, 2014, now Pat. No. 9,613,048.

(51) Int. Cl.
*H04L 29/06* (2006.01)
*H04L 29/08* (2006.01)

(52) U.S. Cl.
CPC .......... *H04L 67/1097* (2013.01); *H04L 67/06* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 6,094,709 | A | 7/2000 | Baylor | |
| 6,466,978 | B1 | 10/2002 | Mukherjee | |
| 6,697,846 | B1 | 2/2004 | Soltis | |
| 7,487,191 | B2 | 2/2009 | Castro | |
| 7,610,285 | B1 | 10/2009 | Zoellner | |
| 7,844,582 | B1 | 11/2010 | Arbilla | |
| 7,865,873 | B1 | 1/2011 | Zoellner | |
| 8,108,338 | B2 | 1/2012 | Castro | |
| 8,296,398 | B2 | 10/2012 | Lacapra | |
| 8,671,248 | B2 | 3/2014 | Shen | |
| 9,201,897 | B1 | 12/2015 | Zeliger | |
| 2001/0033300 | A1 | 10/2001 | Dow | |
| 2005/0108298 | A1* | 5/2005 | Iyengar | G06F 17/30215 |
| 2005/0177624 | A1 | 8/2005 | Oswald | |
| 2010/0100698 | A1 | 4/2010 | Yang | |
| 2010/0325377 | A1 | 12/2010 | Lango | |
| 2010/0333116 | A1 | 12/2010 | Prahlad | |

(Continued)

*Primary Examiner* — William G Trost, IV
*Assistant Examiner* — Imran Moorad
(74) *Attorney, Agent, or Firm* — Mark Spiller

(57) ABSTRACT

The disclosed embodiments disclose techniques for sending interim notifications to clients of a distributed filesystem. Two or more cloud controllers collectively manage distributed filesystem data that is stored in one or more cloud storage systems; the cloud controllers ensure data consistency for the stored data, and each cloud controller caches portions of the distributed filesystem. During operation, a cloud controller receives a client request to perform a namespace operation upon a filesystem object. The cloud controller determines that it will need to contact at least one of another peer cloud controller or a cloud storage system to service the request, and sends an interim notification to the client to notify the client that the request is pending.

12 Claims, 12 Drawing Sheets

(56) References Cited

U.S. PATENT DOCUMENTS

| | | | |
|---|---|---|---|
| 2011/0066668 A1 | 3/2011 | Guarraci | |
| 2011/0276713 A1 | 11/2011 | Brand | |
| 2012/0011176 A1 | 1/2012 | Aizman | |
| 2012/0089781 A1 | 4/2012 | Ranade | |
| 2013/0036089 A1 | 2/2013 | Lucas | |
| 2013/0074065 A1 | 3/2013 | McNeeney | |
| 2013/0117240 A1 | 5/2013 | Taylor | |
| 2013/0205217 A1* | 8/2013 | Schuller | G06F 3/01 715/739 |
| 2014/0006465 A1* | 1/2014 | Davis | G06F 17/30194 707/827 |
| 2014/0129698 A1 | 5/2014 | Seago | |
| 2014/0280800 A1 | 9/2014 | Verchere | |
| 2015/0350159 A1 | 12/2015 | Verma | |

* cited by examiner

SENDING INTERIM NOTIFICATIONS FOR NAMESPACE OPERATIONS FOR A DISTRIBUTED FILESYSTEM

RELATED APPLICATION

This application is a continuation-in-part application of pending U.S. patent application Ser. No. 14/482,934 filed on 10 Sep. 2014 by inventors Yun Lin and John Richard Taylor, entitled, "Sending Interim Notifications to a Client of a Distributed Filesystem". This application hereby claims priority under 35 U.S.C. § 120 to this pending U.S. patent application. The contents of U.S. patent application Ser. No. 14/482,934 are incorporated by reference in their entirety.

BACKGROUND

Field of the Invention

This disclosure generally relates to techniques for providing flexible and extensible network storage systems. More specifically, this disclosure relates to techniques for storing and collaboratively accessing data in a distributed filesystem.

Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments disclose techniques for sending interim notifications to clients of a distributed filesystem. Two or more cloud controllers collectively manage distributed filesystem data that is stored in one or more cloud storage systems; the cloud controllers ensure data consistency for the stored data, and each cloud controller caches portions of the distributed filesystem. During operation, a cloud controller receives a client request to perform a namespace operation upon a filesystem object. The cloud controller determines that it will need to contact at least one of another peer cloud controller or a cloud storage system to service the request, and sends an interim notification to the client to notify the client that the request is pending.

In some embodiments, the client is configured to abort requests that exceed a timeout interval; sending an interim notification to the client before the timeout interval expires ensures that the client does not abort the request.

In some embodiments, the cloud controller determines the level of consistency that is associated with the filesystem object and/or the type of namespace operation that is being requested by the client for the requested file, and then uses this information to determine whether a request will involve remote operations at a remote cloud controller and/or cloud storage system.

In some embodiments, the namespace operation involves the creation of a file. In this scenario, the first cloud controller contacts the owning cloud controller for the associated namespace to claim the file, thereby ensuring that it has exclusive access to the file for the create operation. The owning cloud controller, upon determining that the file does not exist, creates a placeholder that reserves the requested namespace for the file and then notifies the first cloud controller that the namespace for the file has been reserved. Upon receiving this confirmation, the first cloud controller grants a file handle for the file to the client, thereby allowing the client to write data to the new file. Sending the interim notification to the client ensures that the remote aspect of the operation can complete before the client abandons the namespace operation.

In some embodiments, the namespace operation involves the deletion of a file, and the client is requesting to open the file with delete-on-close permissions. The first cloud controller contacts the owning cloud controller to claim the file, thereby ensuring that the first cloud controller has exclusive access to the file for the delete operation. The owning cloud controller confirms to the first cloud controller that the file has been claimed, allowing the first cloud controller to grant the delete-on-close file handle to the client. Sending the interim notification to the client ensures that the remote operations can complete before the client abandons the namespace operation.

In some embodiments, the namespace operation involves the deletion of a file, and the client is requesting to open the file with delete-on-close permissions. The first cloud controller contacts the owning cloud controller to claim the file, the owning cloud controller determines that a third cloud controller presently claims the file, and the owning cloud controller contacts that third cloud controller to determine whether any file handles are presently open for the file. If no file handles are presently open for the file on the third cloud controller: (1) the third cloud controller releases its claim on the file and communicates this to the owning cloud controller; and (2) the owning cloud controller marks the file for deletion and notifies the first cloud controller (that there is no claim outstanding). At this point the first cloud controller can grant a delete-on-close file handle to the client. Sending the interim notification to the client ensures that the remote operations can complete before the client abandons the namespace operation.

In some embodiments, the namespace operation involves the rename of a file, and the namespace operation specifies the filesystem object as the source file and a second filename for a target file. The first cloud controller contacts the owning cloud controller(s) to ensure that a consistent delete operation can be performed for the source file and that a consistent create operation can be performed for the target filename. Sending the interim notification to the client ensures that the remote operations can complete before the client abandons the namespace operation.

In some embodiments, the namespace operation is a hierarchical operation that updates multiple filesystem objects that span multiple levels of a directory hierarchy in the distributed filesystem, and sending the interim notification to the client ensures that the remote operations can complete before the client abandons the namespace operation.

In some embodiments, the cloud controller tracks a set of delays that are associated with accessing the remote cloud controller. The cloud controller determines from the tracked information that the remote request is likely to exceed a client timeout interval, and ensures that the client receives the interim notification before the timeout interval is exceeded.

In some embodiments, the cloud controller calculates an initial interval for an interim notification that gives the remote request as much additional time as possible but also ensures that the client timeout interval is not exceeded. The cloud controller then delays sending the interim notification until this initial interval has expired.

In some embodiments, the cloud controller determines that a remote request may involve substantial delay that exceeds multiple client timeout intervals, and thus send multiple interim notifications to the client to indicate to the client that the request is still pending but needs additional time.

In some embodiments, the client is configured to send asynchronous requests for namespace operations to the cloud controller. Asynchronous requests enable the client, upon receiving an interim notification, to proceed to initiate other namespace operations, file operations and file requests via the cloud controller instead of busy-waiting for a request, thereby improving the performance of namespace operations and file access performance from the client perspective.

In some embodiments, cloud controllers are configured to handle client and cloud controller requests asynchronously, thereby improving the throughput of namespace operations for the distributed filesystem. More specifically, cloud controllers do not block on remote operations and can continue to process new incoming client requests, send interim notifications to clients, and initiate additional remote operations while waiting for a given remote request to complete.

DETAILED DESCRIPTION

Figure 1A:
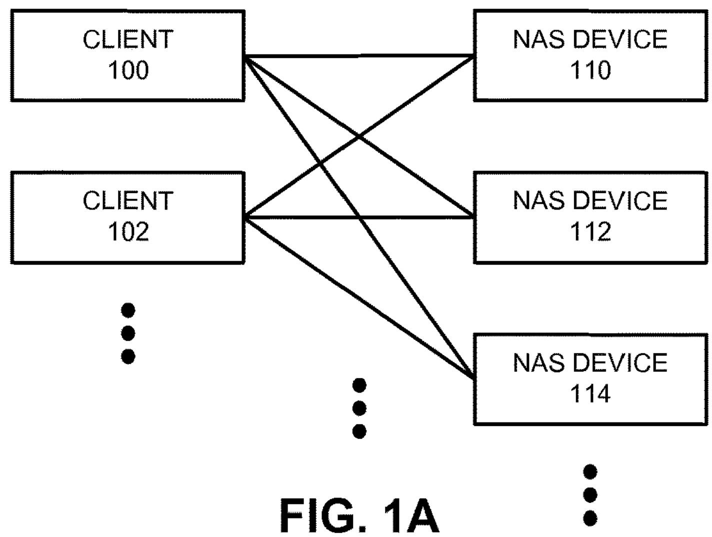
FIG. 1A illustrates a set of clients that are configured to access NAS devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed.

When the hardware modules are activated, the hardware modules perform the methods and processes included within the hardware modules.

Evolution of Network-Based Storage Systems

The proliferation of the Internet and large data sets has motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts. Storage systems typically need to be architected very carefully based on expected client needs, application needs, and load characteristics.

Figure 1B:
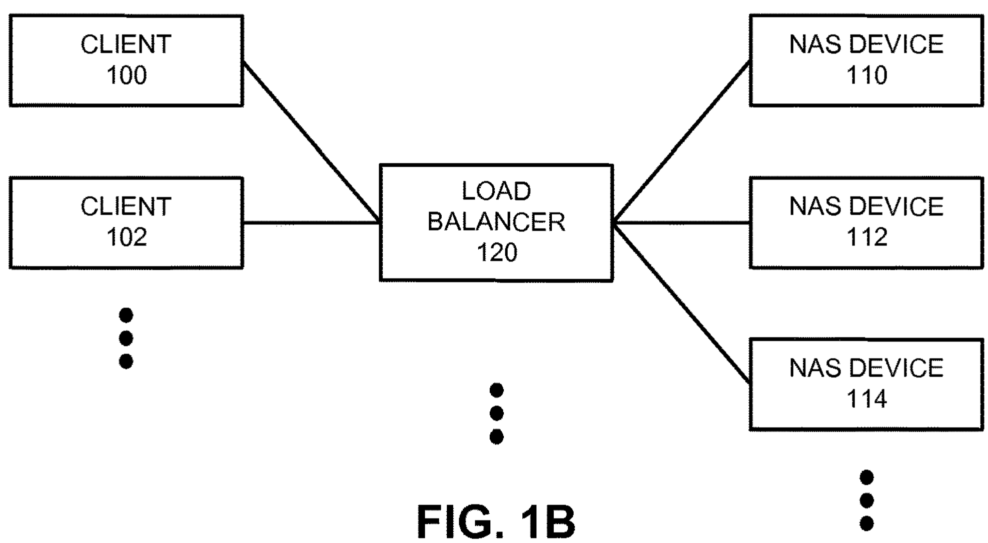
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
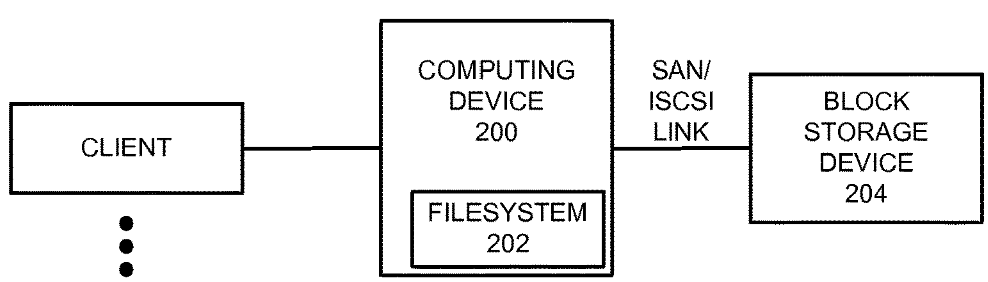
FIG. 2 illustrates a network storage system that provides remote storage with a disk-level abstraction.

FIG. 2 illustrates another network storage system that provides remote storage, but with a disk-level abstraction. In such an architecture, a computing device 200 manages metadata for a filesystem 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and metadata to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem metadata on behalf of filesystem 202, but it is filesystem 202 that provides the higher level of abstraction to the operating system of computing device 200.

A number of "cloud-based storage" vendors (also sometimes referred to as "cloud storage providers") attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Consider a scenario where one remote client attempts to write a set of data to a cloud storage system, and a second remote client attempts to read the data that is being written. In some systems, a reader may not be able to see the existence of newly written file data until the entire write operation has completed (e.g., after the first remote client has closed the file). In other (non-data-consistent) arrangements, the reader may see and access the file, but because writes are stateless and potentially out-of-order (e.g., as in the Network File System (NFS) protocol), does not know which file sections have already been written, and hence may access a mix of valid data and garbage.

Embodiments of the present invention combine aspects of NAS capabilities and cloud-based storage capabilities to provide a high-capacity, high-reliability storage system that enables data to be accessed at different levels of consistency, thereby improving performance without negatively affecting application behavior.

Providing Data Consistency in a Cloud Storage System

In some embodiments, a set of caching storage devices (referred to as "cloud controllers") collectively cache, manage, and ensure data consistency for a set of data that is stored in a network storage system (e.g., a cloud-based storage system, which is also referred to as a cloud storage system). More specifically, one or more cloud controllers work together (e.g., as a federation) to manage a distributed filesystem with a global address space. Each cloud controller maintains (e.g., stores and updates) metadata that describes the file and directory layout of the distributed filesystem and the location of the data blocks in the cloud storage system. Each cloud controller can also cache a subset of the data that is stored in the cloud storage system. A cloud controller that writes (or modifies) data ensures that: (1) data changes are reflected in the cloud storage system; and (2) other cloud controllers in the system are informed of file and metadata changes.

Note that while the cloud storage system stores the data for the distributed filesystem, the cloud storage capabilities may be provided by an external vendor. An enterprise storing sensitive data in the distributed filesystem may not want this vendor to be able to access such data, and hence, the cloud storage system may be configured to store the distributed filesystem's data in the form of encrypted storage volumes (referred to as "cloud files" or "drive files"). This configuration enhances data security, but also prevents the cloud storage system from actively assisting in ensuring data consistency and performing other operations that require knowledge of the data and data layout. More specifically, in some embodiments the cloud controllers fully manage the filesystem and manage data consistency, with the cloud storage system providing purely storage capabilities.

Figure 3:
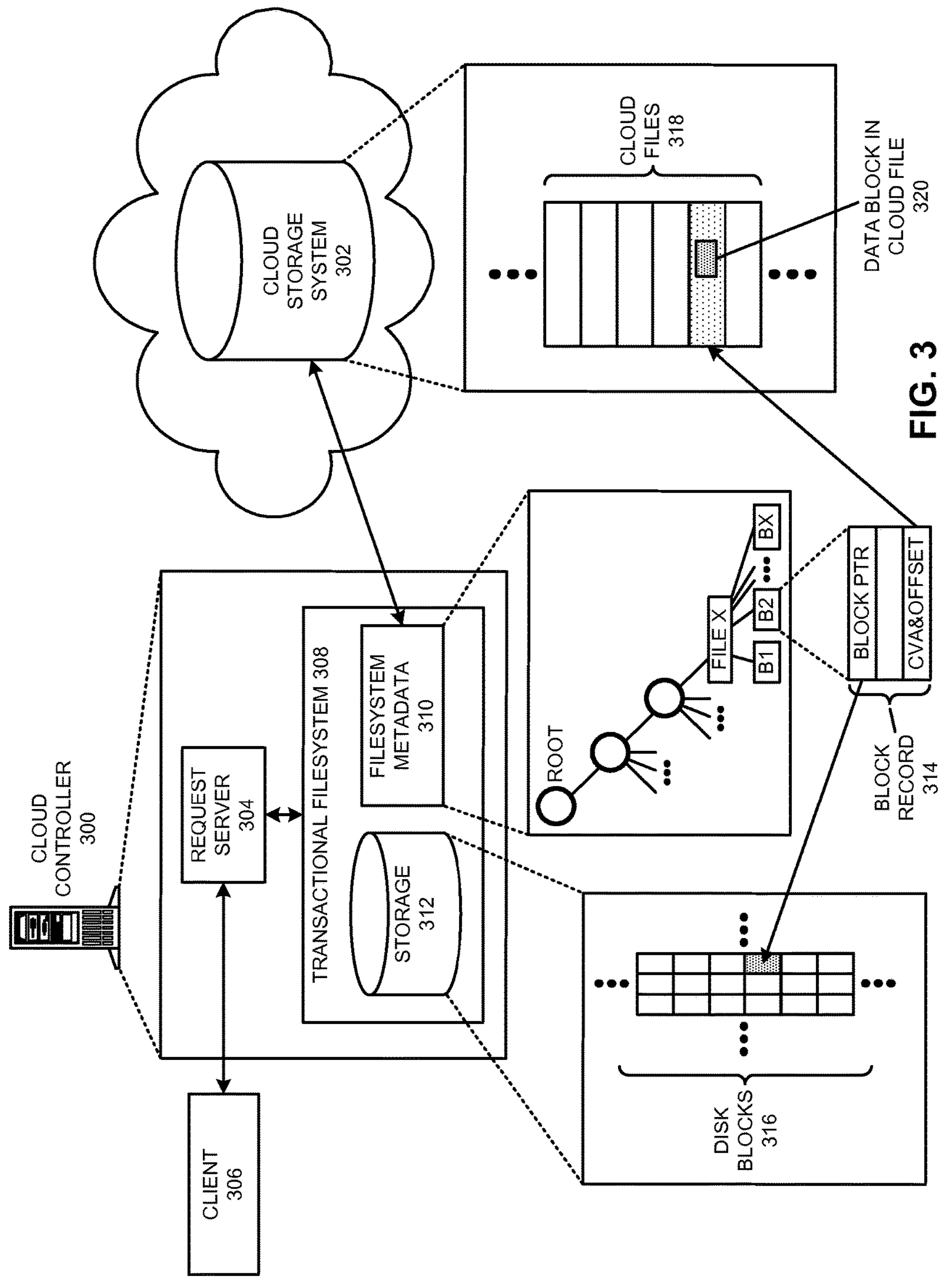
FIG. 3 illustrates an exemplary system in which a cloud controller manages and accesses data stored in a cloud storage system in accordance with an embodiment.

FIG. 3 illustrates an exemplary system in which a cloud controller 300 (e.g., a caching storage device) manages and accesses data stored in a cloud storage system 302. A request server 304 in cloud controller 300 may receive file requests from either local processes or via a network from a client 306. These requests are presented to a storage management system that includes a transactional filesystem 308 that manages a set of filesystem metadata 310 and a local storage system 312. In FIG. 3, the filesystem structure defined by metadata 310 is illustrated as a tree of pointers that define one or more levels of directories and files residing in directories. Each file is described using a set of ordered metadata structures that indicate the set of disk blocks that contain the file's data. A set of block records 314 in metadata 310 include pointer fields that indicate the location of the file data in a disk block 316 in local storage 312 (if the given block is currently being cached in the storage 312 of cloud controller 300), as well as the location of the file data in a cloud file 318. Note that disk blocks 316 and cloud files 318 may have substantially different sizes.

For instance, cloud files might be much larger than disk blocks, and hence the data contained in a disk block 316 may occupy only a portion of a cloud file 320. Hence, one pointer field in block record 314 may consist of a block pointer (labeled "BLOCK PTR" in FIG. 3) that points to a specific disk block, while another field (labeled "CVA&OFFSET") may include both a pointer to a cloud file (also referred to as a "cloud virtual address," or CVA) and an offset into the cloud file.

Note that using a transactional filesystem in each cloud controller does involve some additional overhead. As described above, the transactional filesystem tracks modifications using delta encoding (instead of the more typical read/copy/modify operations used in many non-data-consistent filesystems). For instance, consider a 1 KB modification to an existing 3 KB file in a filesystem that supports 4 KB blocks. Using a traditional approach, the filesystem might read out the original 4 KB block, modify the block to reflect the updates, and then write the modified file back to the same block. In contrast, in a transactional filesystem, the original block is left unchanged, and the filesystem writes out the modifications and additional data to another empty 4 KB block. The metadata for the transactional filesystem is extended to support the notion of partial blocks and deltas (e.g., including one pointer that points to 3 KB of data in one block and another pointer that points to another block that contains 1 KB of additional data and a set of changes that should be applied to the initial 3 KB of data).

In some embodiments, using a transactional filesystem (e.g., transactional filesystem 308 in FIG. 3) in a cloud controller facilitates providing ongoing incremental snapshots of changes to a cloud storage system and other cloud controllers. More specifically, the transactional nature (e.g., the delta encoding of changes) can be extended to include a set of additional metadata structures that track recently changed data in the cloud controller. These additional metadata structures can then be used to quickly and efficiently construct compact snapshots that identify file metadata and file data that has changed due to recent write operations. Note that these snapshots do not involve copying a full set of metadata and/or every byte that was previously written for a file; instead, such snapshots compactly convey only the set of changes for the data set. Sending only a compact set of changes facilitates maintaining data consistency while minimizing the amount of data (and metadata) that needs to be transferred and processed. Sending frequent snapshots ensures that changes are quickly propagated to other cloud controllers and the cloud storage system.

In some embodiments, cloud controllers generate separate metadata snapshots and file data snapshots. Metadata is typically much smaller than file data, and is needed to access file data. Furthermore, each cloud controller is typically configured to maintain (and update) the full set of metadata, but only caches file data that is needed by local clients. Hence, uploading (or sending) a metadata snapshot separately means that the updated metadata will be more quickly available to other peer cloud controllers. Each of these peer cloud controllers can then determine (e.g., based on client data usage and needs) whether to access the related file data associated with the updated metadata. Note that a cloud controller may still upload both metadata updates and file data updates to the cloud storage system, but may split them into different sets of cloud files (or both include the metadata with the file data as well as generate another separate, duplicative update that includes only metadata) so that other cloud controllers can access the two separately. In such an organization, a cloud controller might then send a message to other cloud controllers specifying the location of the stored metadata snapshot. Alternatively, cloud controllers may also be configured to send metadata snapshots directly to a set of peer cloud controllers.

In some embodiments, cloud controllers may use stored snapshot data to provide access to different versions of a file. For instance, when an existing file is being modified, a cloud controller may be configured to present a previous version of the file to clients until the complete set of data for the modified version is available in the cloud storage system. In some embodiments, cloud controllers may maintain records of past snapshots to allow file accesses to be rolled back across multiple different versions, thereby allowing clients to view historical versions of files and/or the changes made to files over time.

In some embodiments, each file in the distributed filesystem is associated with a cloud controller that "owns" (e.g., actively manages) the file. For instance, the cloud controller from which a file was first written may by default be registered (in the file block metadata) as the owner (e.g., the owning cloud controller) of the file. A cloud controller attempting to write a file owned by another cloud controller first contacts the owner with a request to lock the file. The owner can determine whether to grant or deny the lock request. In some embodiments, even if this request is granted, all write operations may be required to go through the cloud controller that owns the file (e.g., new data is written to the local filesystem of the owning cloud controller). Note that while every cloud controller actively manages a set of files, a given cloud controller may not need to continue to cache every disk block of files that it owns; once such blocks have been written to the cloud storage system, they may subsequently be cleared from the cloud controller to make space for other needed data. However, the metadata for all of the files in the distributed system is typically maintained in every cloud controller. In some embodiments, the system may also include mechanisms for transferring ownership of files between cloud controllers (e.g., migrating file ownership to cloud controllers that are the primary modifiers of the file to reduce network latency).

Using such techniques, cloud controllers can treat the cloud storage system as an object store. Other cloud controllers receiving metadata updates can then access data from cloud files as needed. Furthermore, a cloud controller that has uploaded data can, if needed, flush data that has been uploaded from its local filesystem (e.g., "clear its cache") to make space for other data that is more likely to be needed immediately. Note, however, that a cloud controller flushing data still keeps the accompanying metadata, so that the flushed data can be found and reloaded from the cloud storage system if needed again.

In general, the disclosed techniques leverage transactional filesystem techniques and snapshots to ensure that only valid data can be accessed. While these techniques involve some additional complexity, they also provide an assurance of data consistency for a distributed filesystem that leverages cloud storage. Additional techniques for using cloud controller to manage and access data stored in a distributed filesystem are described in more detail in pending U.S. patent application Ser. No. 13/725,767, filed 21 Dec. 2012, entitled "Accessing Cached Data from a Peer Cloud Controller in a Distributed Filesystem," by inventors John Richard Taylor, Randy Yen-pang Chou, and Andrew P. Davis, which is incorporated by reference in its entirety).

Supporting Collaboration in a Distributed Filesystem

The previous sections describe a distributed filesystem in which distributed cloud controllers collectively manage (and provide consistent access to) file data that is stored in a remote cloud storage system. As described, each cloud controller maintains (and updates) a copy of the metadata for the files stored in the distributed filesystem, but only caches a subset of the data stored in the remote cloud storage system that is being accessed (or likely to be accessed) by the respective cloud controller's clients. These cloud controllers use file write locks to ensure that only a single client can write a file at a given time, and then ensure that file modifications are propagated to the remote cloud storage system (e.g., via incremental data snapshots and incremental metadata snapshots).

While the above-described techniques allow metadata and data to be synchronized across a large number of distributed cloud controllers, there may be some delay in propagating snapshots. Such delays may complicate real-time collaboration in scenarios where multiple clients that are distributed across multiple cloud controllers attempt to collaboratively edit and/or access the same files and/or directories. Hence, in some embodiments, cloud controllers may be configured to selectively notify other cloud controllers of changes to specified files. Such techniques may involve reducing delays for collaborative file accesses in a distributed filesystem while ensuring strong read-after-write consistency by allowing cloud controllers to register for change notifications and selectively send change notifications for targeted files. These techniques are described in more detail in pending U.S. patent application Ser. No. 14/298,598, filed 6 Jun. 2014, entitled "Distributed Change Notifications for a Distributed Filesystem," by inventors John Richard Taylor and Yun Lin, which is incorporated by reference in its entirety.

Managing Client Caching in a Distributed Filesystem

In some embodiments, cloud controllers are extended to facilitate client caching. More specifically, cloud controllers can be extended to support "distributed oplock" capabilities that allow cloud controllers to grant opportunistic lock requests and also allow remote cloud controllers to initiate the revocation of opportunistic client locks. Distributed oplocks allow each cloud controller to provide locking capabilities that facilitate client caching (e.g., lock files and perform buffered writes) for files stored in the distributed filesystem while also providing the capability to revoke client locks as needed when distributed clients attempt to collaboratively edit files. The distributed cloud controllers work together to collectively grant locks as requested (where possible), revoke locks as needed, and propagate file changes to their clients, thereby transparently providing the abstraction of a single local fileserver to clients while maintaining strong read-after-write consistency (when needed) for a distributed filesystem. Techniques for extending cloud controllers to support client caching are described in more detail in pending U.S. patent application Ser. No. 14/298,496, filed 6 Jun. 2014, entitled "Managing Opportunistic Locks in a Distributed Filesystem," by inventors Yun Lin and John Richard Taylor, which is incorporated by reference in its entirety.

Synchronization Updates Between Cloud Controllers

In some embodiments, the cloud controllers of a distributed filesystem may be configured to selectively close the synchronization gap of bulk update techniques (such as incremental metadata snapshots) when needed by enabling additional direct transfers of data between two cloud controllers. Such techniques can be used to craft "metadata deltas" that support fast, granular interaction between two (or more) clients that are working on the same set of files via different cloud controllers. Such techniques can involve directly synchronizing changes between cloud controllers to propagate file modifications to collaborators more quickly and proactively pre-synchronizing related files, and are described in more detail in pending U.S. patent application Ser. No. 14/313,703, filed 24 Jun. 2014, entitled "Synchronizing File Updates Between Two Cloud Controllers of a Distributed Filesystem," by inventors Brian Christopher Parkison, Andrew P. Davis, and John Richard Taylor, which is incorporated by reference in its entirety.

Managing Consistency Levels for Files

The previous sections disclose techniques that enable different levels of file consistency to support a range of application and/or collaborative access styles for files in a distributed filesystem. Cloud controllers that manage a distributed filesystem can be configured to enable different levels of file consistency to support a range of application and/or collaborative file access styles. Higher consistency levels facilitate collaborative accesses for distributed clients but may involve additional communication between cloud controllers. Cloud controllers can dynamically adjust the consistency level for individual files as needed based on system and access characteristics to balance performance, fault-tolerance, and application-specific requirements. Techniques for dynamically adjusting the consistency levels for files are described in more detail in pending U.S. patent application Ser. No. 14/482,923, filed 10 Sep. 2014, entitled "Managing the Level of Consistency for a File in a Distributed Filesystem," by inventors Yin Lin, Steve Hyuntae Jung, Vinay Kumar Anneboina, and John Richard Taylor, which is incorporated by reference in its entirety.

Sending Interim Notifications to Clients

As described in preceding sections, different client file access requests in a distributed filesystem may involve a range of cloud controller actions and network interactions. For instance, the number of remote interactions associated with a file access may vary based on the level of consistency that is associated with the file, recent client operations upon the file (by both local and remote clients), the set of file data being cached by the cloud controller, and other factors. Client computing devices, however, may be unaware of all of the factors involved in a file access (or may potentially even be unaware that they are accessing a distributed filesystem), and thus may be configured to abort the file access attempt and flag an error if a given request is not serviced within a specified timeout interval that does not consider network delays.

Consider a file read request (e.g., a READ operation in the CIFS and/or SMB protocols). Any file read request may trigger a download from a cloud storage device. Furthermore, in some instances (e.g., depending on the file's consistency level) a file read request may also involve contacting the owning cloud controller for the file to ensure that read access can be granted and/or a synchronization request to another peer cloud controller that has recently modified the requested file. While some of the previously described techniques disclose metering data transfers from the cloud controller to the client to keep a data connection open (as described in pending U.S. patent application Ser. No. 13/971,621, filed 20 Aug. 2013, entitled "Avoiding Client Timeouts in a Distributed Filesystem," by inventors Richard Sharpe, John Richard Taylor, and Randy Yen-pang Chou, which is incorporated by reference in its entirety), if the time interval required to retrieve an initial set of data from a remote cloud storage system or cloud controller exceeds the client timeout interval, the requesting client may time out the request and signal an error for the file read request, which is undesirable.

A file write request (e.g., a CREATE operation in the CIFS and/or SMB protocols, which may include a number of flags that select file create and/or write options) typically involves even more remote requests than a file read request. More specifically, a write operation may also involve a claim request to the cloud controller that owns the file as well as read and/or synchronization requests that ensure that the cloud controller has the most recent copy of the file. Even if cloud controllers use the previously-described synchronization optimization techniques, in some situations network delays, network traffic, or other factors can substantially delay an operation and lead to the client timeout interval being exceeded.

In some embodiments, cloud controllers are configured to determine whether a client file access request will involve remote operations and, if so, signal to the requesting client that the file access is pending and should not be abandoned. For instance, a cloud controller receiving a client request to access a file may check the metadata for the file to determine whether a remote operation is needed (e.g., based on the type of access being requested and the current consistency level for the file), initiate one or more remote operations, and send an interim response to the client to indicate that a response is pending. For example, for the CIFS and/or SMB protocols a cloud controller might send an interim "PENDING" response that indicates to the client that the cloud controller is working on the request, and that the client should not abort the request and/or drop the connection.

In some embodiments, a cloud controller can delay sending an interim notification for an initial time interval (e.g., for a portion of the client timeout interval, if known) to give the remote operations more time to complete. For instance, a cloud controller may track the delays associated with different cloud controllers and file request types, use such information to calculate an anticipated delay for different remote operations, and then use the tracking information and calculations to determine whether and/or when to send an interim response. Such techniques may be especially beneficial for protocols that only allow one interim response to be sent to a client. Note that in some alternative embodiments where multiple responses can be sent to clients, the cloud controller may determine that a remote operation may involve substantial delay (or be taking longer than expected) and send multiple subsequent pending indications to indicate to the client that the requested operation has not failed, but just needs more time to complete.

Figure 6:
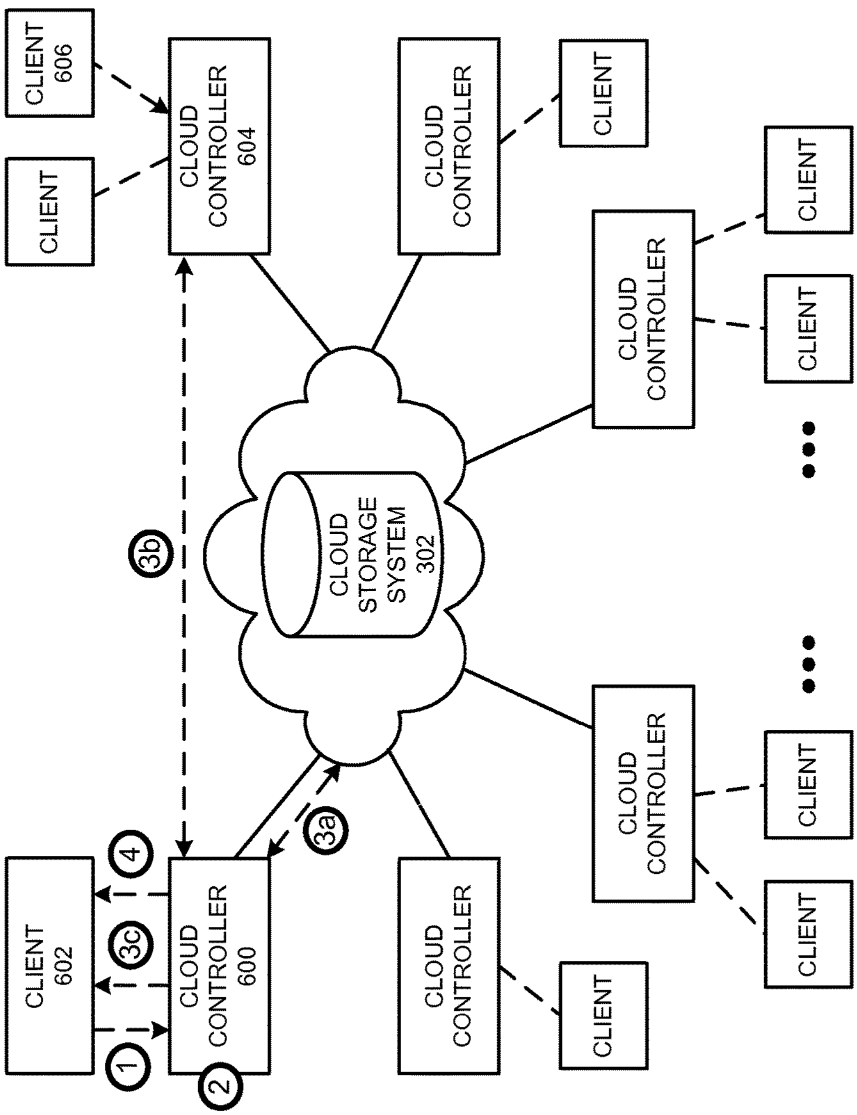
FIG. 6 illustrates a scenario in which a client contacts a cloud controller to access a file in the distributed filesystem and receives an interim notification from the cloud controller in accordance with an embodiment.

FIG. 6 illustrates a scenario in which a client 602 contacts a cloud controller 600 to access a file in the distributed filesystem and receives an interim notification from cloud controller 600. More specifically, during operation, client 602 contacts cloud controller 600 with a file read and/or write request (operation 1). Cloud controller 600 determines whether the client request involves any remote requests to cloud storage system 302 or one or more remote cloud controllers (e.g., cloud controller 604). If not, cloud controller 600 can address the request and reply directly to client 602 (operation 4), and no interim notifications are needed. If, however, cloud controller 600 determines that the client request involves a request to cloud storage system 302 (operation 3*a*) and/or a remote cloud controller such as cloud controller 604 (operation 3*b*), cloud controller 600 may send one or more interim notifications (e.g., "PENDING" responses) to client 602 in parallel (and/or subsequent to) sending the remote requests (operation 3*c*). Interim notifications ensure that client 602 is informed of the (potential) delays and does not abandon the request due to the delay. Once any needed remote requests have completed, cloud controller 600 sends an appropriate response for the request to client 602 (operation 4). Note that, as described above, cloud controller 600 may take advantage of knowledge of client timeout intervals to optimize the timing for interim notifications. For instance, if cloud controller 600 determines (or is informed) that a typical client timeout interval is one minute, cloud controller 600 can determine whether remote operations are likely to exceed the timeout interval and use the timeout interval knowledge to send timely interim notifications to client 602 that discourage client 602 from abandoning the file access request prematurely.

In some embodiments, using interim notifications can improve performance for both cloud controllers and clients, especially if either computing device otherwise would use synchronous operations for any aspects of file accesses. More specifically, interim notifications can facilitate making file operations asynchronous (e.g., non-blocking). For instance, a client that otherwise might busy-wait on a reply from a file server (e.g., a cloud controller) might instead be able to instead proceed to perform other operations after receiving an interim response. For example, a multi-threaded client file browsing application that is generating thumbnails for a directory (and thus needs to access the contents of many files in that directory, as described previously) can leverage such asynchronous operations to launch multiple requests in parallel. For example, the client can continue to request other files irrespective of any pending remote operations, while also operating immediately upon file data that is immediately available from the local cloud controller and (indirectly) initiating additional remote operations via the cloud controller for any other needed file data that is not yet available on the local cloud controller.

Note that clients (and/or client applications) may be limited to a specified number of outstanding file access requests to a cloud controller; this limitation may be implemented on either (or both of) the client or the cloud controller. In some embodiments, clients may be configured to make use of this knowledge, in combination with interim notifications, to further optimize performance. For instance, a client that needs to operate upon many files in rapid succession may choose to abandon requests that return an interim response in order to access other files; in some implementations a cloud controller may still complete the remote operations associated with the canceled requests and may then already have the updated file data and/or access permissions available if the client re-tries the request again later.

Support for asynchronous (non-blocking) operations on a cloud controller allow the cloud controller to respond to other clients requests while waiting for latent remote operations to complete, thereby lowering response times and improving general file access behavior for clients. For instance, if multiple client requests (either from the same or different clients) involve remote operations, an asynchronous cloud controller can, instead of busy-waiting for a remote operation: (1) initiate a first remote operation; (2) send an interim notification to the requesting client; and then (3) service one or more additional client requests and, if needed, initiate one or more additional remote operations that will be processed (remotely) in parallel.

Figure 7:
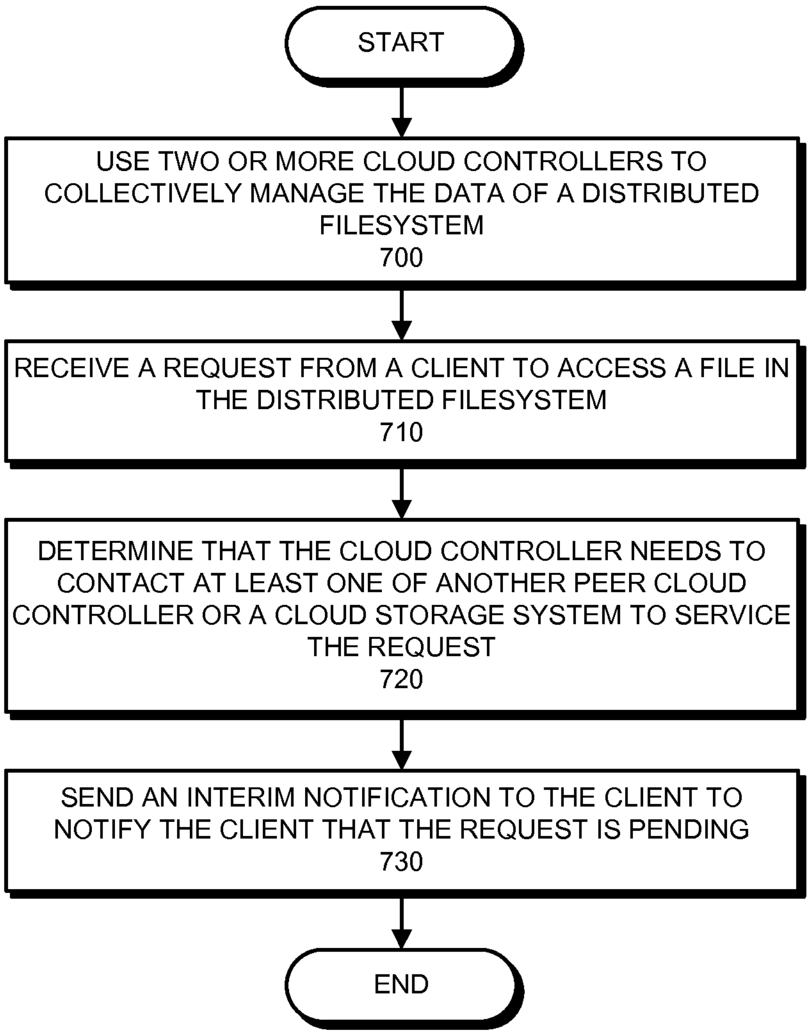
FIG. 7 presents a flow chart that illustrates the process of sending interim notifications to a client of a distributed filesystem in accordance with an embodiment.

FIG. 7 presents a flow chart that illustrates the process of sending interim notifications to a client of a distributed filesystem. Two or more cloud controllers collectively manage distributed filesystem data that is stored in one or more cloud storage system (operation 700); the cloud controllers ensure data consistency for the stored data, and each cloud controller caches portions of the distributed filesystem. During operation, a cloud controller receives a client request to access a file (operation 710). The cloud controller determines that it will need to contact at least one of another peer cloud controller or a cloud storage system to service the request (operation 720), and sends an interim notification to the client to notify the client that the request is pending (operation 730).

In summary, cloud controllers can be configured to send interim notifications to clients whose file access requests involve remote operations that include (but are not limited to) file opens, file reads, file writes, file and/or directory renaming, and byte-range locking of file content. These interim notifications signal to clients that requests are still pending and give cloud controllers more time to service requests that involve remote operations without the respective client giving up. Such interim notifications also facilitate asynchronous (non-blocking) execution on both the client and cloud controller, thereby improving file access performance and efficiency.

Global Namespace Consistency for a Distributed Filesystem

The previous sections disclose techniques for supporting different levels of consistency for file read and write operations. In general, operations that involve multiple client devices accessing distributed, cooperating cloud controllers are more complex than operations that involve a single fileserver, and the cloud controllers collectively need to ensure that colliding requests do not cause inconsistent file operations that can lead to application failure and/or file corruption. Performing namespace operations in a distributed filesystem involves providing namespace consistency without substantially sacrificing file access performance. The disclosed techniques seek to ensure global namespace consistency in a manner that preserves performance for a distributed filesystem.

Consider namespace operations in the context of a single fileserver. When one client creates a file on the fileserver, other clients can typically see the file being created, and a second client that subsequently attempts to create a file with the same name in the same directory receives an "object name collision" error from the fileserver. Similarly, when a client deletes a file, other clients that subsequently attempt to delete the same file receive an "object path not found" error. Furthermore, after a delete request for a file has been acknowledged and confirmed, subsequent attempts to open attempts to open that file should fail. Substantially similar guarantees apply to rename operations; the renamed file (1) remains visible via the original name until the operation is confirmed; (2) no longer exists (via the original name) from the time the operation is confirmed; and (3) should then be immediately visible and accessible via the new name. While these examples are described in the context of files, directory operations follow the same principles. After a client creates a directory, a second client cannot create the same directory again (e.g., another object name collision error), and a renamed directory cannot be subsequently opened via its original name.

In some embodiments, providing global namespace consistency for a distributed filesystem comprises configuring cloud controllers to collectively present clients with the abstraction of accessing files on a single fileserver. More specifically, cloud controllers collaborate to ensure that multiple storage nodes that are distributed across wide area networks still guarantee strong name consistency. For instance, if a client creates a file in the distributed filesystem via a first cloud controller, a second client located at either the same or a different geographic location cannot subsequently create the same file.

Note that providing global namespace consistency for a distributed filesystem may involve making trade-offs to facilitate scalability. For instance, making the namespace strongly consistent for all accesses and all files across all cloud controllers may result in substantial latency; alternatively, if global consistency is abandoned to reduce latency, additional, complex techniques may be needed to resolve conflicts after the fact to restore namespace consistency. Instead, cloud controllers may be configured to treat different types of files differently, with some file types (or file operations) guaranteeing strong consistency, while some other less consistency-sensitive operations may be resolved lazily. More specifically, cloud controllers can be configured to provide a range of capabilities that provide sufficient levels of namespace consistency to ensure that applications executing on clients that access the distributed filesystem can successfully operate in a distributed environment (e.g., as if they were accessing a single local fileserver).

In some embodiments (as described previously), the namespace of the distributed filesystem is partitioned, and individual cloud controllers are configured to "own" (i.e., manage) and ensure namespace consistency for their assigned portion of the global namespace. Cloud controllers receiving client requests that involve namespace operations contact the owning cloud controller for that respective portion of the namespace; the owning cloud controller ensures that any potentially conflicting operations for its portion of the namespace are handled correctly. For instance, if one cloud controller requests a file deletion (on behalf of a first client) while a second cloud controller requests a file creation for the same file (on behalf of a second client), the owning cloud controller can, based on the order in which the requests are received, arbitrate the proper order and validity of the ensuing operations (e.g., either granting permission or returning errors to the requesting cloud controllers as appropriate). More specifically, cloud controllers attempting to perform certain namespace operations upon files (or directories) first contact the owning cloud controller to claim the item in question (as described previously), thereby ensuring that they have the (exclusive, if needed) access permissions for the item that are needed to proceed without risk of collisions. As described previously for read/write consistency, some low-consistency read operations can be performed without claiming a file, but in some embodiments a claim operation is typically needed for operations that write to, create, delete, and rename objects in the distributed filesystem. Note that cloud controllers may create temporary (and/or local-only) files in a special namespace area that is only known (and managed by) the local cloud controller; such special handling can reduce latency for files that do not need stronger namespace consistency.

Figure 8:
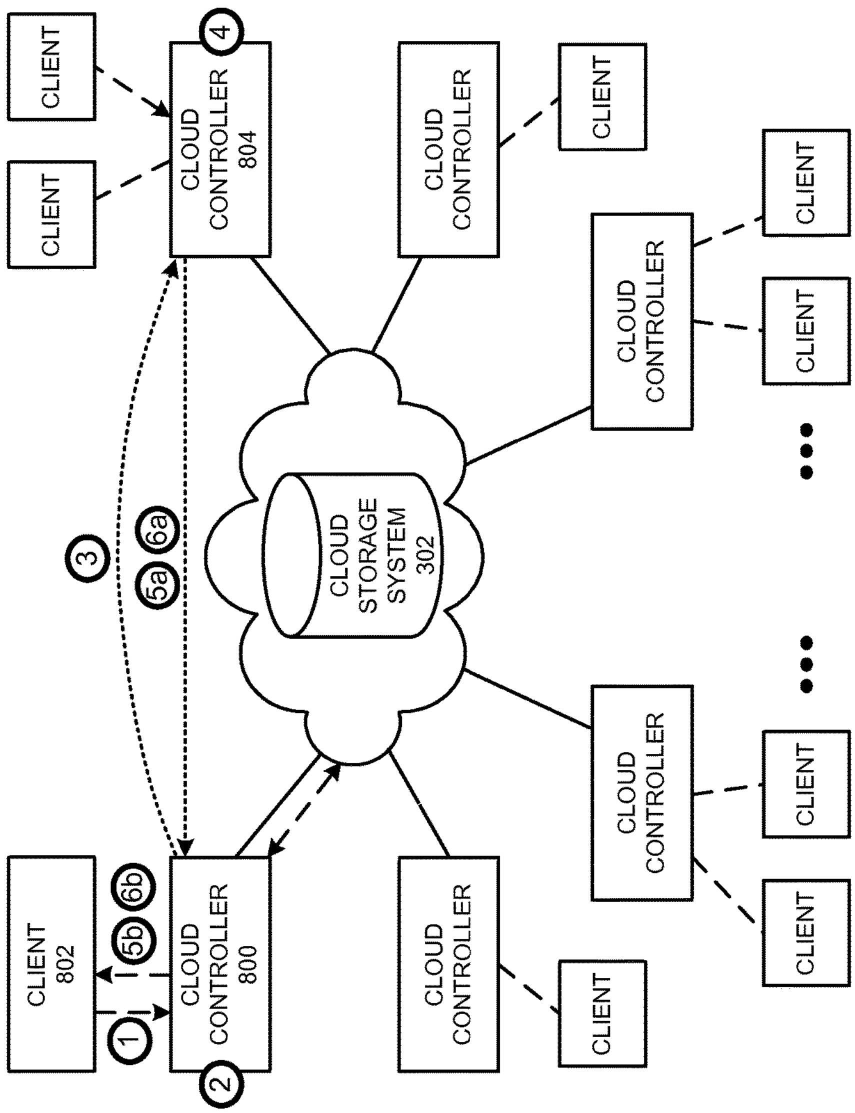
FIG. 8 illustrates an exemplary scenario in which a client contacts a cloud controller to create an object in the distributed filesystem in accordance with an embodiment.

FIG. 8 illustrates an exemplary scenario in which a client 802 contacts a (typically local) cloud controller 800 to create an object in the distributed filesystem. More specifically, during operation, client 802 contacts cloud controller 800 with a request to create a file or directory in a specified location in the global namespace (operation 1). Cloud controller 800 determines that the requested portion of the global namespace is managed by cloud controller 804 (operation 2), and sends a claim request for the object and desired location to cloud controller 804 (operation 3). Cloud controller 804, as the name authority for that portion of the namespace, determines whether the requested object already exists; if so, cloud controller 804 returns a corresponding error to cloud controller 800 (operation 5*a*), which then in turn notifies client 802 that the object already exists (operation 5*b*). Alternatively, if cloud controller 804 determines that the object does not already exist, cloud controller 804 reserves the filename (or directory name) and notifies cloud controller 800 that the filename has been reserved (operation 6*a*). In the case of a file, cloud controller then grants a file handle for the new file to client 802 (operation 6*b*), which can then use the file handle to open and start writing data to the new file.

Note that in some embodiments the actual creation of a new file may involve additional communication between cloud controller 800 and cloud controller 804. For instance, cloud controller 804 may be configured to reserve the location using a placeholder that identifies both the object that is being created and the requesting cloud controller; this placeholder also can serve to grant data ownership (e.g., "claimed" status) to the requesting cloud controller. Cloud controller 804 might not initially create the file yet, but instead may grant cloud controller 800 the right to create the file and ensure that other clients (and other cloud controllers) cannot create the file; the placeholder ensures that a subsequent attempt to create the same file that is received even milliseconds later will receive a "file already exists" error. Upon receiving the response from cloud controller 804, cloud controller 800 may (1) send a formal create request to cloud controller 804, or (2) may be configured to proceed to create the file locally, grant the file handle to client 802 (which then proceeds to operate upon the file) and then subsequently notify cloud controller 804 and the other cloud controllers for the distributed filesystem of the actual file creation and data operations via incremental metadata and data snapshots (as described previously). Hence, in some configurations, other cloud controllers may not even see a new object until they receive the first snapshot containing changes for the object, unless they attempt to create the same object. If the file is identified to need a higher level of consistency, cloud controller 800 can also use the previously described synchronization techniques to propagate changes to interested cloud controllers. For example, a cloud controller that subsequently attempts to create the same object (and receives an "object already exists" error from the owning cloud controller 804 due to the placeholder) may at that point register interest in the object to receive notifications and/or faster updates for the object.

The above techniques preserve the abstraction of a single fileserver at the cost of some additional latency; creating an object involves the round-trip latency of contacting the owning cloud controller that manages the target namespace, but ensures that an object will not be created more than once for a given location in the global namespace hierarchy. Such trade-offs are sometimes unavoidable in a distributed filesystem. In some embodiments, additional network and computing bandwidth may be further leveraged to speed up the propagation of updates throughout the system. For instance, in some embodiments an owning cloud controller might also be configured to broadcast object creations to the other cloud controllers. Alternatively, such techniques might only be applied to specified files that are known to need higher consistency (e.g., specific file names or file types). In many scenarios, object creation is a relatively rare event (e.g., applications only occasionally create objects, and are more likely to read, write, and/or modify objects), and thus, given the rarity of create operations, such notifications can be used to propagate the news of file creations more quickly without substantially impacting the performance of other distributed filesystem operations. Such behavior may be fine-tuned based on bandwidth availability, bandwidth usage, and bandwidth improvements over time.

Similar factors need to be considered for delete operations in a distributed filesystem environment. Files are often deleted via a "delete-on-close" operation, which involves opening a file on a client (e.g., performing all of the requisite checks on the associated fileserver to ensure that the file can be opened with the requested delete-on-close permissions) and then deleting the file from the fileserver when the client closes the file. For delete-on-close operations files in a distributed filesystem (e.g., for a "lock file" that is used to synchronize multiple distributed clients that may be collaborating on a project or otherwise accessing a limited, shared resource), such files would be globally visible to all clients, and delete operations need to be managed carefully to ensure that no other clients of the distributed filesystem erroneously access (or are denied access to) the resource that is being locked. As with create operations, such coordination and assurances typically involve remote operations with an owning cloud controller.

Consider some potential challenges for delete operations in a distributed environment. In a naïve approach, a cloud controller receiving a delete request from a client might be configured to immediately respond to the client with a positive acknowledgement, and then attempt to manage the rest of the delete operation behind the scenes with the other cloud controllers for the distributed filesystem. However, such efforts might subsequently fail (e.g., due to that cloud controller crashing before being able to contact the owning cloud controller for the file, or due to a communication link failure), which could leave the global namespace in an inconsistent state and lead to application failure. For instance, such a failure might lead to a lock file not being properly deleted, thereby preventing a set of cooperating applications from accessing a lock-controlled resource and leading to application deadlock. While applications know the appropriate application-specific failure semantics for the range of file operations they perform, configuring cloud controllers with similar knowledge (for an entire application space!) would be burdensome and potentially impossible. Another potential issue for the naïve approach involves timing serialization; if a delete operation can occur asynchronously on a non-owning cloud controller before consulting the owning cloud controller, multiple distributed clients may attempt to delete the same file at the same time, and other local clients may try to create the file again (e.g., a lock file) before the initial delete has propagated to the owning cloud controller, thereby creating a race condition between deleting and creating the file. Thus, as with create operations, cloud controllers are configured to ensure that operation order is preserved and that applications do not fail in unexpected ways.

Figure 9:
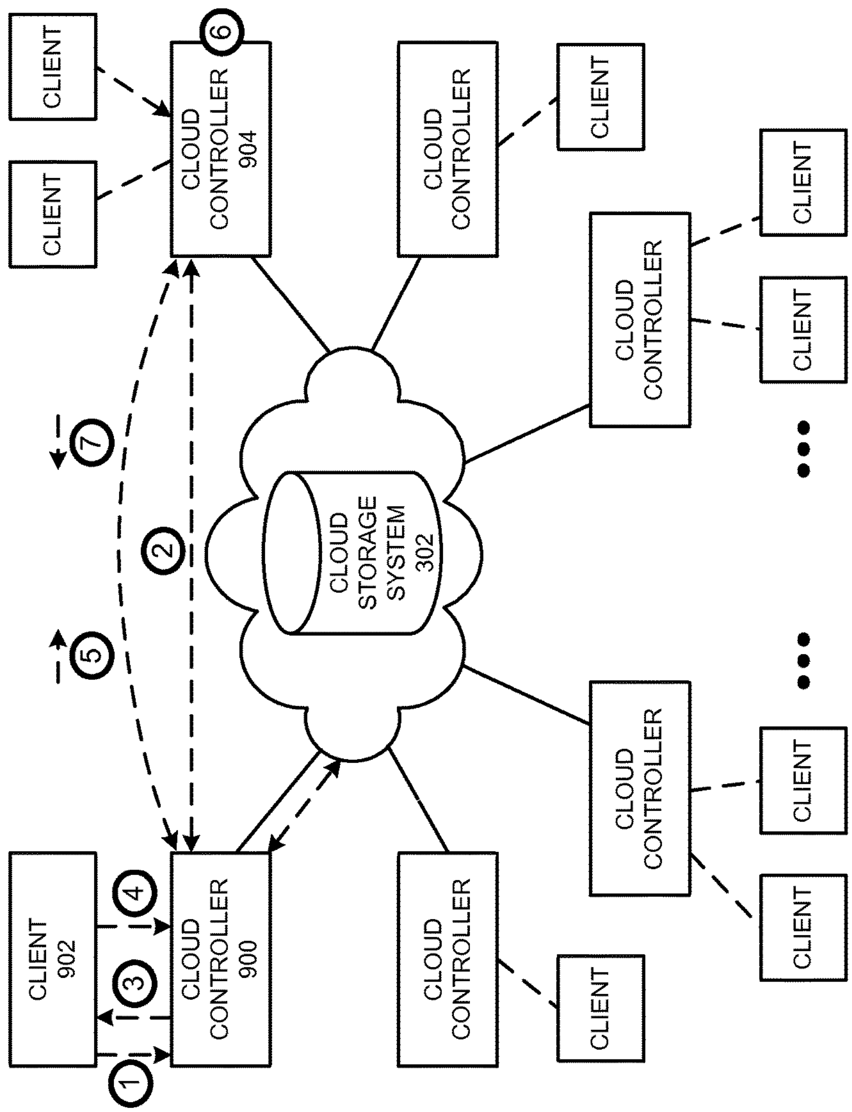
FIG. 9 illustrates an exemplary set of operations that occur in the context of a local cloud controller when a client deletes a file in a distributed filesystem in accordance with an embodiment.

FIG. 9 illustrates an exemplary set of operations that occur in the context of a local cloud controller 900 when a client 902 deletes a file in a distributed filesystem. After receiving the delete request (e.g., a request to open the file with delete-on-close permissions) from client 902 (operation 1), cloud controller 900 determines and contacts the owning cloud controller to first claim the target file (operation 2). Once the file has been successfully claimed, cloud controller 900 provides a file handle to the client (e.g., allowing the client to open the file with a delete-on-close file handle). Upon subsequently receiving a request from the client to close (and hence delete) the file (operation 4), cloud controller 900 sends the deletion request to owning cloud controller 904 (operation 5), which then records the deletion operation (operation 6) before sending confirmation of the delete back to requesting cloud controller 900 (operation 7). The owning cloud controller 904 for the file, as the manager of the target portion of the global namespace, is the cloud controller that knows most precisely the state (and existence status) of the file, and manages the deletion process. More specifically, owning cloud controller 904 registers that the file is being deleted and communicates this to the requesting cloud controller, which then also marks the file as deleted and notifies the requesting client that the file has been deleted. One or both of the cloud controllers also notify the other cloud controllers of the deleted file (e.g., either via the previously described snapshot technique or, if the file was registered for a higher level of consistency, via the previously described synchronization techniques). Note that if another client attempts to delete the same file (e.g., in the timeframe after which the owning cloud controller 904 has received the first request, but a snapshot update has not yet propagated throughout all of the cloud controllers for the distributed filesystem), owning cloud controller 904 receives this second request, determines that the file has already been registered as deleted, and returns a file not found error for the subsequent request. Similarly, if another cloud controller (acting on behalf of another client) contacts owning cloud controller client 904 in an attempt to create the same file before owning cloud controller 904 has received the delete request, owning cloud controller 904 returns an error indicating that the file already exists. However, if another client subsequently attempts to create the same file via a different cloud controller after owning cloud controller 904 has received the delete request, owning cloud controller 904 indicates that the file does not currently exist, and allows a new version of the file to be created, substantially similar to the behavior for a single fileserver.

Note that while the example of FIG. 9 involves claiming ownership of a file before deleting the file, in some implementations claiming ownership also involves synchronizing the data for file that are being claimed. Such data synchronization can add latency to delete operations, and is typically unnecessary if the target file is going to be deleted anyway. Thus, in some embodiments, delete operations may involve an alternative communication exchange (e.g., a two-phase distributed locking operation) between cloud controllers instead of a claim operation.

Figure 10:
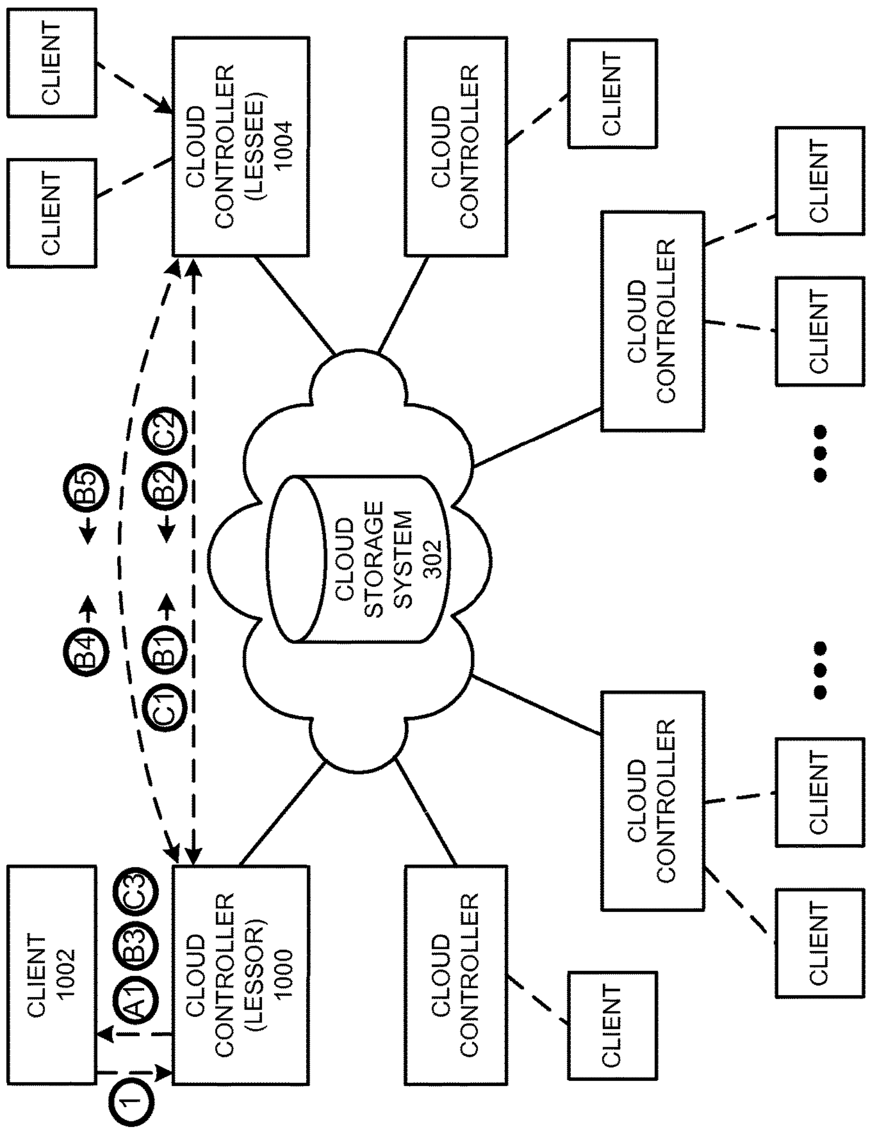
FIG. 10 illustrates a first set of exemplary scenarios in which a cloud controller receives a delete request for a target file in a distributed filesystem in accordance with an embodiment.
Figure 11:
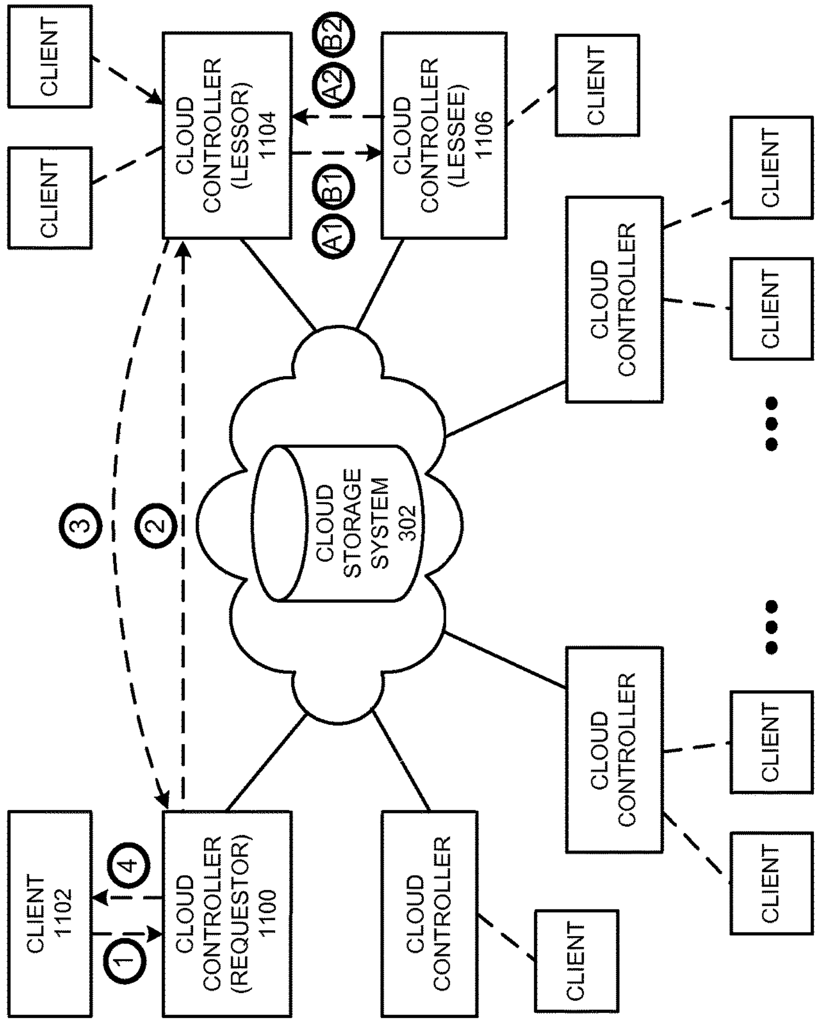
FIG. 11 illustrates a second set of exemplary scenarios in which a cloud controller receives a delete request for a target file in a distributed filesystem in accordance with an embodiment.

FIGS. 10-11 illustrate several additional exemplary scenarios that occur in the context of a cloud controller 1000 receiving from a client 1002 a delete request for a file in a distributed filesystem (e.g., a request to open a file with delete-on-close permissions). These scenarios involve distributed locking operations that do not involve claim operations.

In FIG. 10, cloud controller 1000 receives client 1002'*s* delete request (operation 1) and determines that it manages the namespace containing the target file (e.g., cloud controller 1000 is the owning cloud controller, or lessor, for the target file. From here, possible scenarios include:

- No other cloud controller currently has the file claimed: In this scenario, lessor 1000 does not need to claim the file, and can simply mark the file as pending deletion and provide the requested file handle to client 1002 (operation A1). When client 1002 closes the target file, lessor 1000 proceeds to delete the file (not shown).
- Another cloud controller 1004 previously claimed (and still holds) data ownership for the file, but has no file handles open for the file: In this scenario, lessor 1000 sends a deletion request to that cloud controller 1004 (referred to as the "lessee") (operation B1). If no clients of the lessee 1004 currently have open file handles for the file, lessee 1004 returns success for the deletion operation to lessor 1000 (operation B2), thereby indicating to lessor 1000 that the file can be deleted. Lessor 1000 marks the file for deletion, and grants the requested file handle to client 102 (operation B3). Upon receiving the subsequent client file close (not shown), lessor 1000 sends confirmation of the delete to lessee 1004 (operation B4), which then confirms to lessor 1000 that the file has been deleted (operation B5), thereby completing the two phase delete operation.

Another cloud controller 1004 previously claimed (and still holds) data ownership for the file, and has a file handle open for the file: As above, lessor 1000 sends a deletion request to the lessee 1004 (operation C1). Now, however, lessee 1004 does have a client with an outstanding file handle for the file, and returns failure in response to the lessor's file access request (operation C2), indicating that the file cannot be deleted at this time. The lessor, cloud controller 1000, returns an error message to client 1002 indicating that the delete cannot be opened for deletion at this time (operation C3).

In FIG. 11, cloud controller 1100 receives client 1102's close-on-delete request (operation 1) and determines that cloud controller 1104 manages the namespace for (e.g., is the lessor for) the target file. Cloud controller 1100 contacts lessor 1104 with a delete request for the target file (operation 2). From here, possible scenarios include:

Lessor 1104 determines that the target file is currently unclaimed, marks the file for deletion, and returns a positive response to cloud controller 1100 (operation 3), which in turn provides the requested file handle to client 1102 (operation 4). When client 1102 closes the target file, lessee 1100 proceeds to notify lessor 1104, which deletes the file and sends confirmation to requestor 1100 (operation not shown).

Lessor 1104 determines that another cloud controller 1106 previously claimed (and still holds claim to) data ownership for the target file. Lessor 1104 contacts cloud controller 1106 (the lessee in this scenario) with a delete request for the target file (operation A1). Lessee 1106 determines that no file handles are currently open for the file, and returns positive confirmation for the request back to lessor 1106 (operation A2). Lessor 1106 marks the file for deletion, and returns a confirmation to cloud controller 1100 (operation 3), which in turn returns the requested file handle to client 1102 (operation 4). Note that lessee 1106'*s* response to lessor 1104 effectively releases the claim to the file. When client 1102 closes the target file, cloud controller 1100 proceeds to notify lessor 1104, which deletes the file and returns confirmation (not shown). In some embodiments, lessor 1104 may also send a subsequent confirmation of deletion to cloud controller 1106 (operation not shown).

Lessor 1104 determines that another cloud controller 1106 previously claimed (and still holds claim to) data ownership for the target file. Lessor 1104 contacts cloud controller 1106 with a delete request for the target file (operation B1). Cloud controller 1106 determines that a client still has an outstanding file handle for the file, and returns failure in response to lessor 1104'*s* deletion request (operation B2), indicating that the file cannot be deleted at this time. Lessor 1104 indicates this delete failure to cloud controller 1100 (operation 3), which returns an error message to client 1102 indicating that the delete cannot be completed at this time (operation 4).

Note that in some scenarios cloud controller 1100 may be the current lessee (data owner) for the target file (instead of cloud controller 1106). In such scenarios, cloud controller 1100 (because it is already the data owner of the file) can immediately determine success or failure for the delete-on-close file-handle request. More specifically, upon receiving the request from client 1102 (operation 1), cloud controller 1100 can determine whether any other outstanding file handles are currently open for the target file. If, cloud controller 1100 can immediately return an error message to client 1102 indicating that the file cannot be accessed for deletion at this time. If there are no (conflicting) outstanding file handles, cloud controller can return the requested file handle to client 1102, and upon the client closing the file, send a deletion notification to lessor 1104 (e.g., as operation 4). Note that while cloud controller 1100 still needs to inform lessor 1104 of a pending delete operation to ensure that the filesystem namespace is kept up to date, this notification (operation 2) and confirmation (operation 3) can occur in parallel with operation 4 because cloud controller 1100 already has claimed data ownership for the target file. Thus, this scenario involves fewer communication hops and hence less latency.

Network and/or cloud controller failures may result in some potential complications for both claim- and non-claim-based deletion operations for a distributed filesystem. For instance, consider a scenario in which a requesting cloud controller contacts a lessor to delete a file and the lessor needs to contact a third cloud controller that holds a data ownership claim for the target file. Involving three controllers and multiple communication hops increases the possibility that device and/or network congestion or failures may occur during the operation. Recovering from such failures can increase complexity, and motivates making such operations transactional to ensure that global consistency is maintained. For the above scenarios, failures that occur prior to a lessor receiving a data owner's positive response (allowing deletion) would typically result in the target file not being deleted. However, a failure could occur after the lessor has marked the file as deleted and sent return confirmation to the requesting cloud controller; for instance, the confirmation packet could be lost. However, the lessor will also still propagate a metadata snapshot indicating the deletion of the target file, so the requesting cloud controller will subsequently be notified, thereby ensuring a return to consistency. Note also that any subsequent attempts to delete the target file would also involve contacting the lessor, which has the most up-to-date status about the target file's current (deleted) state. Thus, while brief periods of inconsistency may arise, the distribution of snapshots provides a safety net that ensures the ongoing consistency for the distributed filesystem.

Consider another scenario in which: 1) a lessor contacts a cloud controller that has been granted data ownership of a target file to request the deletion of a target file; 2) the data owner determines that no file handles are open and responds positively; and 3) the data owner's response is lost (and never reaches the lessor). From the lessor's perspective the file still exists and owned by the data owner, but the data owner may consider the claim to have been released and the file to have been deleted. All of the other cloud controllers for the distributed filesystem also still identify the target file as still existing. However, the data owner is configured to send out a metadata snapshot indicating the release of data ownership of the target file. The lessor: 1) receives this metadata snapshot and detects this release action; 2) reconciles the deletion of the target file; and 3) issues another metadata snapshot that notifies all of the other cloud controllers of the deletion as well. Note that any other cloud controllers attempting to claim the target file in the interval before the releasing cloud controller's metadata snapshot has been received would need to contact the lessor, which is aware of the pending delete operation and can ensure that no inconsistency arises for the target file.

The above examples describe techniques for deleting files. Directory deletion builds upon potentially multiple such file deletions, and thus may involve some additional complexity. More specifically, in some embodiments deleting a directory may involve checking the ownership and status for every object in the hierarchy below the target directory, because each file might be claimed and/or being accessed via a different cloud controller (and associated clients). Thus, for directories that contain multiple files and/or directories, such operations may take a substantial amount of time. Some protocols and clients may allow the deletion of populated directories in one operation, but other configurations may require clients to delete all directory contents prior to actually deleting a directory, thereby potentially increasing the amount of time needed to delete the directory and thus the likelihood of collisions (e.g., other clients opening files in the target directory). Such limitations may make directory deletion and rename more complex in terms of reliability, robustness, and failure recovery.

Note that while some of the preceding examples discuss creating and deleting lock files, the disclosed techniques can be applied to any files that are being created and/or deleted, as well as to other styles of create and delete operations.

Figure 12:
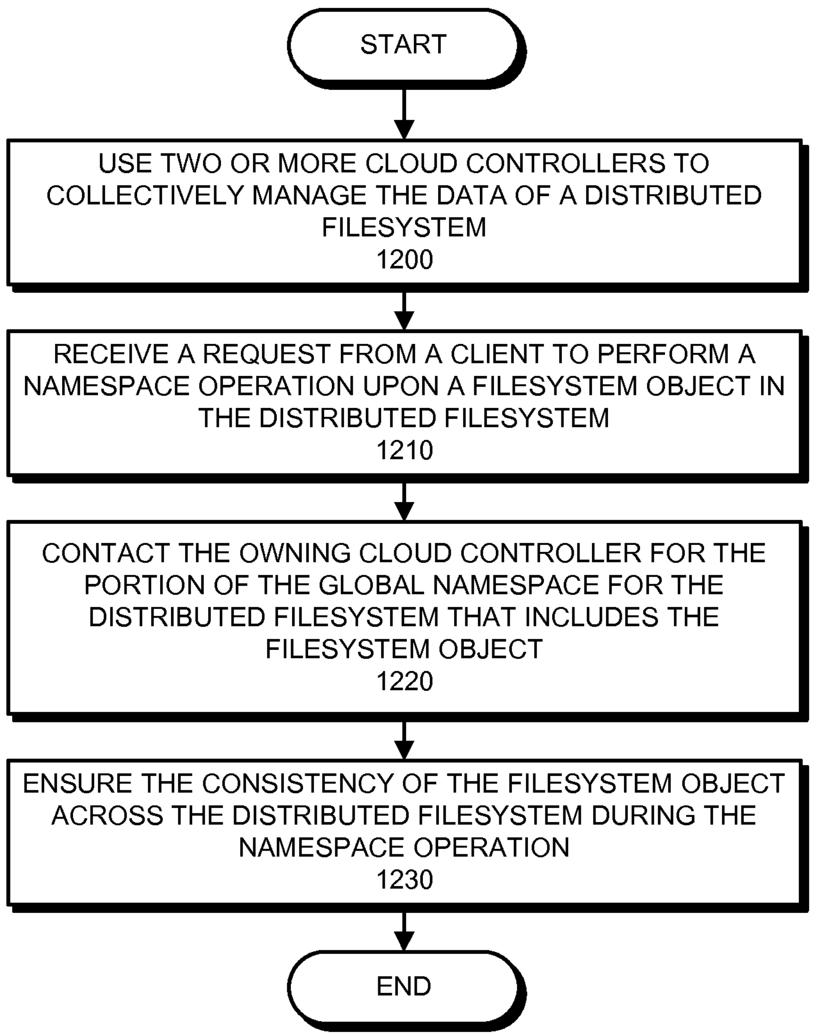
FIG. 12 presents a flow chart that illustrates the process of maintaining global name consistency for a distributed filesystem in accordance with an embodiment.

FIG. 12 presents a flow chart that illustrates the process of maintaining global name consistency for a distributed filesystem. Two or more cloud controllers collectively manage distributed filesystem data that is stored in one or more cloud storage system (operation 1200); the cloud controllers ensure data consistency for the stored data, and each cloud controller caches portions of the distributed filesystem. During operation, a cloud controller receives a client request to perform a namespace operation upon a filesystem object in the distributed filesystem (operation 1210). The cloud controller contacts the cloud controller that manages ("owns") the portion of the global namespace for the distributed filesystem that includes the filesystem object (operation 1220). This second cloud controller ensures the consistency of the filesystem object across across the distributed filesystem during the namespace operation (operation 1230).

In some embodiments, cloud controllers may be configured to facilitate relaxed file access consistencies that (selectively) allow deleted files to temporarily remain visible and accessible to one or more clients that are accessing the file at the time of deletion. Note that such relaxed consistencies may be determined based on a range of factors (e.g., file type, namespace location, registrations, etc). While only one cloud controller can claim data ownership (e.g., for writing) for a file at a time, multiple clients accessing that cloud controller may read the same file simultaneously, and multiple other clients may also be able to simultaneously access the file for low-consistency read operations via other cloud controllers (e.g., because such read operations do not require the file to be claimed by those clients' local cloud controllers). Consider an exemplary scenario in which multiple readers access a given file via one cloud controller while a client accessing a different cloud controller: 1) attempts to open the same file for delete-on-close; 2) is granted a file handle by the owning cloud controller (because the other relaxed-consistency readers have not claimed the file); and 3) then closes the file handle (thereby prompting the deletion of the file). In some embodiments, the other readers reading the file via the other cloud controller may continue to read that file until that cloud controller receives notification of the deletion (either via normal incremental metadata snapshots or more rapid synchronization techniques if they are enabled and registered for that file), or potentially even longer. For instance, for distributed change notification techniques, a synchronization notification would trigger an oplock break event to clients that have opportunistically locked the file, causing the clients to flush their file handles (after which the cloud controller can delete the file). Alternatively, for incremental metadata snapshots, cloud controllers may be configured with a range of possible behaviors. For instance, in some embodiments cloud controllers, upon receiving such a snapshot, will respond to subsequent requests to view or open that file from the directory structure of the distributed filesystem with an "object name not found" error. However, clients that still have a valid file handle open for that file may be allowed (depending on cloud controller configuration) to continue reading the file data until the last local file handle for the file is closed (at which time the file is actually deleted); thus, in this configuration, there may be a time window in which some clients may be reading stale data associated with a deleted file. However, because these clients originally chose to open the file with relaxed consistency restraints, this is not an error; client applications are configured to specify (and hence are expected to be able to handle) the level of consistency that they are requesting at the time they request a file handle, and should be configured to respond appropriately to any errors that arise in that context. In some alternative embodiments, a deleted file may remain visible (and accessible) in the local namespace of a given cloud controller until all of the local clients of that cloud controller have closed their outstanding file handles for the file.

Note that for claim-based deletion techniques that only one cloud controller can claim a file (from the owning cloud controller) at a given point in time, and thus the same file cannot simultaneously be open for close-on-delete on multiple cloud controllers; the owning cloud controller ensures this by rejecting subsequent claim requests (e.g., signaling a sharing violation) when the file is already currently claimed. In some embodiments, however, multiple clients accessing the distributed filesystem via the same cloud controller, which is holding the claim for a file, may both be able to open the same file with delete-on-close access permissions (e.g., if both request shared read/write/delete-on-close permissions), as long as subsequent requests are received before any delete-on-close accesses actually close the file handle. Furthermore, multiple clients may be able to simultaneously open the same target file with delete-on-close permissions if non-claiming delete techniques are used. In situations with multiple simultaneous delete-on-close handles, the first close received would lead to the deletion being confirmed with the owning cloud controller, but as described above other accesses may be allowed to continue until the cloud controller detects (e.g., using reference counters) that the file is no longer being accessed. This behavior guarantees strong consistency for delete (e.g., deletes are never lost, and the same object cannot be deleted more than once), while allowing multiple clients to access files on their local cloud controller using the same delete-on-close semantics as with a stand-alone local server.

In some embodiments, a rename operation for a distributed filesystem is a namespace operation that logically combines the deletion of an existing filesystem object and the creation of a new filesystem object into a single atomic operation. More specifically, a requesting cloud controller may be configured to first request a delete-on-close handle for the existing object (e.g., either file or directory) name to ensure that the object exists and can actually be opened for delete, and then claim the new object name and location to ensure that the target does not exist already. Note that while confirming that the source object exists and can be opened for delete is often considered a pre-condition, these operations can also be performed in the opposite order. Either way, both the delete and create operations need to succeed as one atomic operation for a rename operation to be successful; if either operation fails, the rename operation cannot proceed. For instance, otherwise a cloud controller might delete the first file only to discover that another cloud controller has in the meantime created the target file, which might lead to filesystem inconsistency (including the potential forking of file contents) and potentially require collision resolution.

As with create and delete operations, strong consistency demands that a given filesystem object cannot be renamed more than once; contacting the namespace owner for both the source and target files before proceeding ensures this. Note that in some scenarios the source and target locations may be in different portions of the namespace that are associated with different owning cloud controllers. In such scenarios, the requesting cloud controller may send respective create and delete requests to the two different owning cloud controllers, and only allows the operation to proceed if both claims are granted successfully.

In some embodiments, cloud controllers may be configured to propagate directory rename operations to the other cloud controllers for the distributed filesystem as quickly as possible. In some implementations, there is no notion of data ownership for directories; instead, cloud controllers send a directory rename request to the lessor (or namespace owner) for the directory. The lessor then determines whether the rename request is valid and/or allowed, and if so, proceeds to commit the change and rename the directory. In some embodiments, the lessor then broadcasts this change to all of the other cloud controllers for the distributed filesystem in an attempt to reduce potential inconsistency. For instance, clients of other cloud controllers may be browsing through the same target directory hierarchy (that is being renamed), and thus may eventually try to access file paths or modify filenames that no longer be valid once the directory has been renamed. Broadcasting directory rename operations to all cloud controllers can facilitate resolving such issues. Note, however, that such broadcast messages are not guaranteed; for instance, a cloud controller may be offline or partitioned from the network at the time of broadcast, and thus not receive the notification. However, directory rename operations can also be included in incremental metadata snapshots, thereby ensuring that all cloud controllers are notified of directory renames and that the distributed filesystem remains consistent.

In some embodiments, cloud controllers may also be configured to track and propagate the ordering for multiple rename operations upon the same directory. For instance, consider a scenario in which a directory A is renamed to B, and then subsequently renamed back to A again. A cloud controller that misses the broadcast notifications for these directory rename operations would need to be careful when applying log information from the incremental metadata snapshots to ensure that the operations are applied in the correct order (e.g., in the above example, resolving to the eventual name of A instead of B). Thus, in some embodiments, incremental metadata snapshots are configured to convey the order of operations accurately, thereby serving as a journal for rename operations that preserves the sequential nature of the rename operations and guarantees that the rename operations will be replayed in the same sequence that they occurred. As before, while there may be some brief inconsistencies (e.g., when one cloud controller goes offline for some reason and needs to process queued snapshots upon returning to service), such inconsistencies are resolved quickly to return the distributed filesystem to a consistent state.

The previous sections disclose techniques for providing different level of consistency for file read and write operations, and also disclose techniques that involve sending additional client notifications during remote file reads and writes. More specifically, as described in the previous section for read and write operations, contacting a remote cloud controller may involve substantial network delays that may exceed a client timeout interval. However, as described above, namespace operations such as create, delete, and rename also involve contacting a (potentially) remote owning cloud controller, and hence may also involve substantial latencies that lead to client timeouts.

In some embodiments, cloud controllers are configured to send interim notifications to clients as needed whenever a cloud controller determines that a client request involves a remote request to another cloud controller and/or cloud storage provider. More specifically, a requesting cloud controller may, upon determining that a remote request is needed for a requested namespace operation, send one or more subsequent interim notifications to the client that requested the namespace operation to ensure that the client request does not time out and that the client does not busy-wait upon the completion of the namespace operation. Handling namespace operations as asynchronous requests allows the client and the requesting cloud controller to proceed with subsequent file requests and operations during the interval in which the namespace operation is being processed, thereby improving the efficiency of client request handling.

In some embodiments, cloud controllers may also send interim notifications to clients for namespace operations (as well as non-namespace operations) that involve local (e.g., non-remote) requests that are known to involve considerable latency. Consider, for instance, a "set access control information" (or "setACI") operation, which involves modifying the metadata (e.g., the filename, access history, size, etc) for one or more files and/or directories. A recursive setACI operation upon a directory may involve updating multiple levels of a directory hierarchy and potentially thousands (or more) files, and can take a considerable amount of time. A local cloud controller may process such a request and then distribute the metadata updates via incremental metadata updates (or, if specified, via other strongly-consistent notification mechanisms) without contacting an owning cloud controller, but the operation may be sufficiently time consuming to lead to a client timeout. Sending interim notifications from the cloud controller to the client ensures that even local (but time-intensive) namespace operations do not fail (and potentially need to be unrolled) due to client timeouts.

Figure 13:
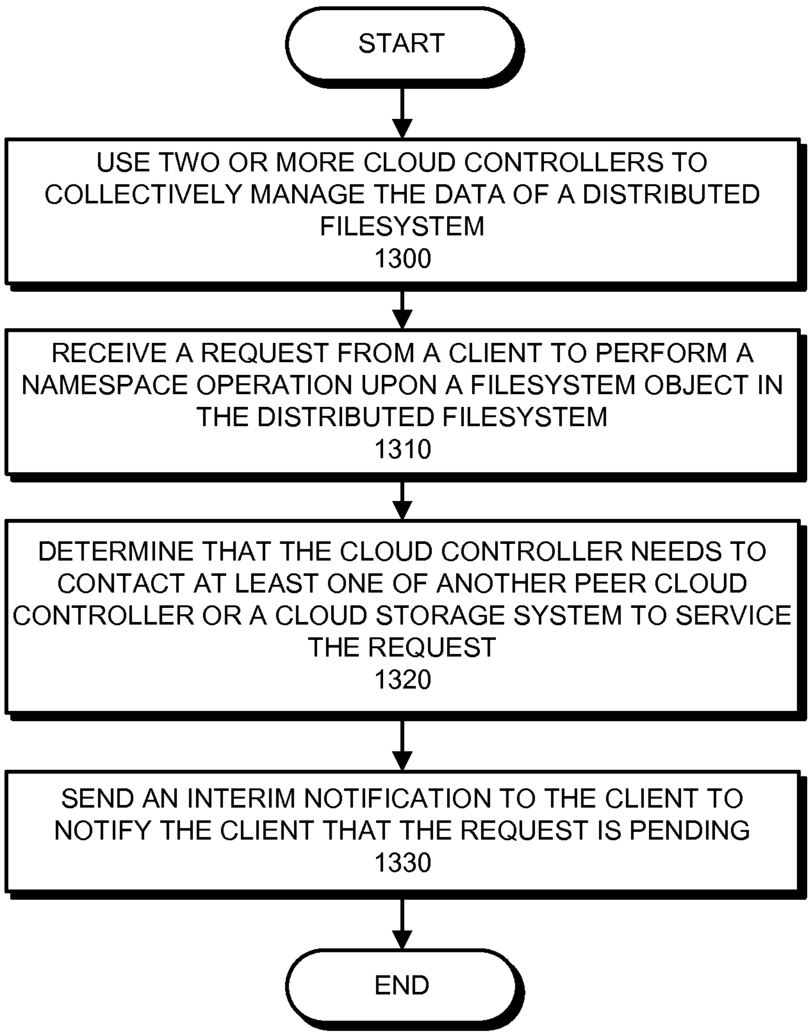
FIG. 13 presents a flow chart that illustrates the process of sending interim notifications to clients of a distributed filesystem in accordance with an embodiment.

FIG. 13 presents a flow chart that illustrates the process of sending interim notifications to clients of a distributed filesystem. Two or more cloud controllers collectively manage distributed filesystem data that is stored in one or more cloud storage systems (operation 1300); the cloud controllers ensure data consistency for the stored data, and each cloud controller caches portions of the distributed filesystem. During operation, a cloud controller receives a client request to perform a namespace operation upon a filesystem object (operation 1310). The cloud controller determines that it will need to contact at least one of another peer cloud controller or a cloud storage system to service the request (operation 1320), and sends an interim notification to the client to notify the client that the request is pending (operation 1330).

In summary, cloud controllers can be configured to guarantee global namespace consistency for a distributed filesystem. Cloud controllers receiving namespace requests (e.g., create, delete, and rename requests) are configured to contact the cloud controller(s) that own the namespace being operated upon; the owning cloud controller(s) then manage the operation in a way that ensures namespace consistency across all of the cloud controllers of the distributed filesystem. Cloud controllers may also be configured to send interim notifications to clients that have requested namespace operations, thereby ensuring that the clients do not timeout during namespace operations that involve time-sensitive and/or remote requests.

Computing Environment

In summary, embodiments of the present invention facilitate storing and accessing data in a distributed filesystem. A set of distributed cloud controllers manage data stored in a cloud-based storage system to provide a high-capacity, high-reliability storage system that ensures data consistency. These cloud controllers cache the set of data that is being used by their respective clients, store updates in cloud files on the cloud storage system, and forward updates to each other via incremental snapshots. Additional techniques can be applied to reduce access and propagation delays for files that are being collaboratively edited and/or accessed by remote clients via different cloud controllers. Hence, the disclosed embodiments present an abstraction of one global, extensible filesystem while preserving the abstraction of high-speed local data access.

Figure 4:
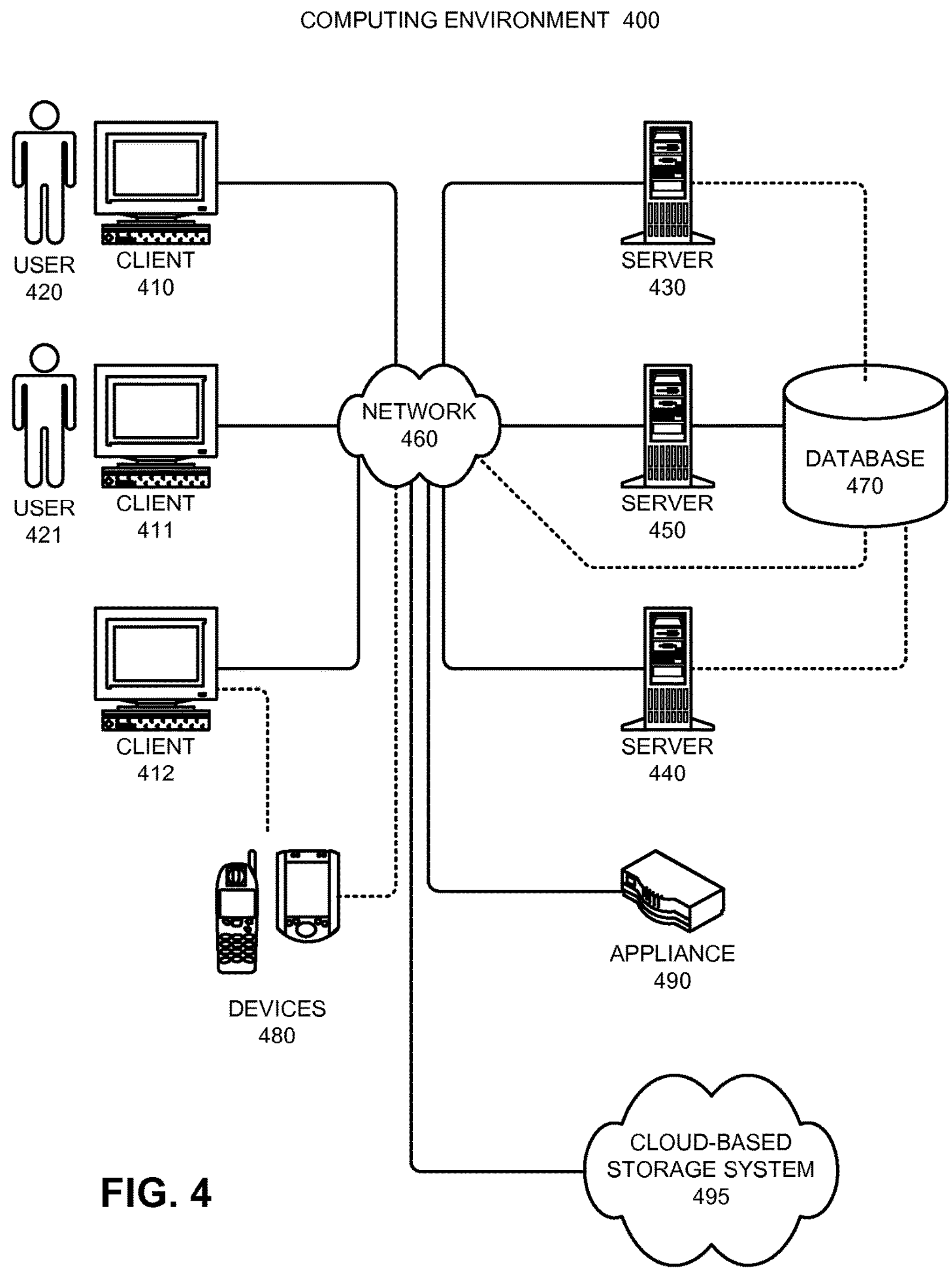
FIG. 4 illustrates a computing environment in accordance with an embodiment.

In some embodiments of the present invention, techniques for managing and/or accessing a distributed filesystem can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, appliance 490, and cloud-based storage system 495.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. Alternatively, other entities in computing environment 400 (e.g., servers 430-450) may also store such data.

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Cloud-based storage system 495 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 400. In general, any device that includes computational and storage capabilities may incorporate elements of the present invention.

Figure 5:
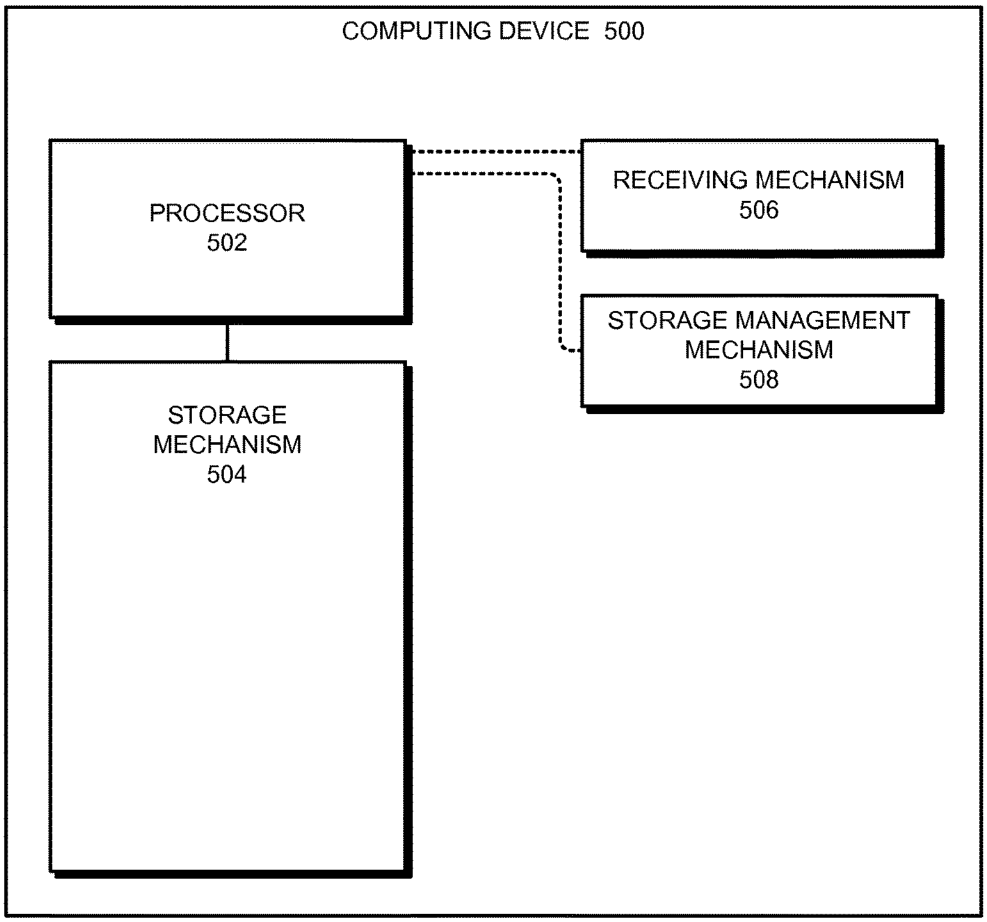
FIG. 5 illustrates a computing device in accordance with an embodiment.

FIG. 5 illustrates a computing device 500 that includes a processor 502 and a storage mechanism 504. Computing device 500 also includes a receiving mechanism 506 and a storage management mechanism 508.

In some embodiments, computing device 500 uses receiving mechanism 506, storage management mechanism 508, and storage mechanism 504 to manage data in a distributed filesystem. For instance, storage mechanism 504 can store metadata for a distributed filesystem, and computing device 500 can use receiving mechanism 506 to receive a request to access a data block for a file. Program instructions executing on processor 502 can traverse the stored metadata to identify a metadata entry that is associated with the data block. Storage management mechanism 508 can use this metadata entry to download a cloud file containing the data block from a cloud storage system.

In some embodiments of the present invention, some or all aspects of receiving mechanism 506, storage management mechanism 508, and/or a filesystem device driver can be implemented as dedicated hardware modules in computing device 500. These hardware modules can include, but are not limited to, processor chips, application-specific integrated circuit (ASIC) chips, field-programmable gate arrays (FPGAs), memory chips, and other programmable-logic devices now known or later developed.

Processor 502 can include one or more specialized circuits for performing the operations of the mechanisms. Alternatively, some or all of the operations of receiving mechanism 506, storage management mechanism 508, and/or a filesystem device driver may be performed using general-purpose circuits in processor 502 that are configured using processor instructions. Thus, while FIG. 5 illustrates receiving mechanism 506 and/or storage management mechanism 508 as being external to processor 502, in alternative embodiments some or all of these mechanisms can be internal to processor 502.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for sending interim notifications for a namespace operation to a client of a distributed filesystem, the method comprising:

collectively managing the data of the distributed filesystem using two or more cloud controllers, wherein collectively managing the data comprises storing the data for the distributed filesystem in one or more cloud storage systems, wherein the cloud controllers cache and ensure data consistency for data stored in the cloud storage systems;

receiving at a first cloud controller a request from the client to perform a namespace operation upon a filesystem object, wherein the client is configured to abort the request if the duration of the request exceeds a timeout interval;

determining that the first cloud controller needs to contact at least one of a second, distinct cloud controller or a cloud storage system to service the request by performing actions that comprise:

determining a specified level of consistency associated with the filesystem object and the type of namespace operation being requested by the client for the filesystem object; and determining from at least one of the specified level of consistency and the type of filesystem object access that the request involves a remote request from the first cloud controller to at least one of the second cloud controller or the cloud storage system; and sending an interim notification to the client to notify the client that the request is pending, wherein the first cloud controller is configured to send the interim notification to the client before the timeout interval expires to ensure that the client does not abort the request;

wherein sending the interim notification further comprises tracking a set of delays associated with accessing the second cloud controller, determining from the tracked information that the remote request will exceed the client timeout interval, and ensuring that the client receives the interim notification before the timeout interval is exceeded.

2. The computer-implemented method of claim 1, wherein the namespace operation is a create operation and the filesystem object is a file;

wherein the first cloud controller contacts the second cloud controller to claim the file to ensure that the first cloud controller has exclusive access to the file for the create operation;

wherein the second cloud controller, upon determining that the file does not exist, creates a placeholder that reserves the requested namespace for the file and then notifies the first cloud controller that the namespace for the file has been reserved;

wherein the first cloud controller, upon receiving notification of the namespace reservation, grants a file handle for the file to the client, thereby allowing the client to write data to the new file, and wherein sending the interim notification to the client facilitates ensuring that the remote operations can complete before the client abandons the namespace operation.

3. The computer-implemented method of claim 1, wherein the namespace operation is a delete operation and the filesystem object is a file;

wherein the request from the client is a request to open the file with delete-on-close permissions;

wherein the first cloud controller contacts the second cloud controller to claim the file to ensure that the first cloud controller has exclusive access to the file for the delete operation;

wherein the second cloud controller sends confirmation to the first cloud controller that the file has been claimed;

wherein, upon receiving confirmation of the file being claimed from the second cloud controller, the first cloud controller grants a delete-on-close file handle to the client; and wherein sending the interim notification to the client facilitates ensuring that the multiple remote operations can complete before the client abandons the namespace operation.

4. The computer-implemented method of claim 1, wherein the namespace operation is a delete operation, wherein the filesystem object is a file;

wherein the request from the client is a request to open the file with delete-on-close permissions;

wherein the first cloud controller contacts the second cloud controller to ensure that the first cloud controller has exclusive access to the file for the delete operation;

wherein the second cloud controller determines that a third cloud controller is presently claiming the file and contacts the third cloud controller to determine whether any file handles are presently open for the file;

wherein the second cloud controller, upon receiving confirmation that no file handles are open for the file on the third cloud controller, marks the file for deletion, wherein a response from the third cloud controller that indicates that no file handles are open for the file further indicates that the third cloud controller now no longer claims the file;

wherein the second cloud controller notifies the first cloud controller that no other cloud controllers are presently claiming the file;

wherein the first cloud controller grants a delete-on-close file handle to the client; and wherein sending the interim notification to the client facilitates ensuring that the multiple remote operations can complete before the client abandons the namespace operation.

5. The computer-implemented method of claim 1, wherein the namespace operation is a rename operation;

wherein the filesystem object is a file;

wherein the namespace operation specifies the file as the source file and a target filename;

wherein the first cloud controller contacts the second cloud controller to ensure that a consistent delete operation can be performed for the file in the distributed filesystem and that a consistent create operation can be performed for the target filename in the distributed filesystem; and wherein sending the interim notification to the client facilitates ensuring that the multiple remote operations can complete before the client abandons the namespace operation.

6. The computer-implemented method of claim 1, wherein the namespace operation is a hierarchical operation that updates multiple filesystem objects that span multiple levels of a directory hierarchy in the distributed filesystem; and wherein sending the interim notification to the client facilitates ensuring that the multiple operations can complete before the client abandons the namespace operation.

7. The computer-implemented method of claim 1, wherein sending the interim notification to the client further comprises:

calculating an initial interval that maximizes the time available to perform the remote request that without exceeding the timeout interval; and delaying sending the interim notification from the first cloud controller to the client until the initial interval has expired.

8. The computer-implemented method of claim 1, wherein sending the interim notification to the client further comprises:

determining that the remote request may involve delay that exceeds multiple client timeout intervals; and sending multiple interim notifications to the client to indicate to the client that the request is still pending but needs additional time.

9. The computer-implemented method of claim 1, wherein the client is configured to send asynchronous requests for namespace operations to the first cloud controller; and wherein, upon receiving the interim notification, the client proceeds to initiate other namespace operations via the first cloud controller instead of blocking on the request, thereby improving the performance of namespace operations for the client.

10. The computer-implemented method of claim 1, wherein the two or more cloud controllers are configured to handle requests received from the client and the two or more cloud controllers asynchronously, thereby improving the throughput of namespace operations for the distributed filesystem; and wherein the first cloud controller does not block on remote operations and continues to process new incoming client requests, send interim notifications to clients, and initiate additional remote operations while waiting for a given remote request to complete.

11. A non-transitory computer-readable storage medium storing instructions that when executed by a computer cause the computer to perform a method for sending interim notifications for a namespace operation to a client of a distributed filesystem, the method comprising:

collectively managing the data of the distributed filesystem using two or more cloud controllers, wherein collectively managing the data comprises storing the data for the distributed filesystem in one or more cloud storage systems, wherein the cloud controllers cache and ensure data consistency for data stored in the cloud storage systems;

receiving at a first cloud controller a request from the client to perform a namespace operation upon a filesystem object, wherein the client is configured to abort the request if the duration of the request exceeds a timeout interval;

determining that the first cloud controller needs to contact at least one of a second, distinct cloud controller or a cloud storage system to service the request by performing actions that comprise:

determining a specified level of consistency associated with the filesystem object and the type of namespace operation being requested by the client for the filesystem object; and determining from at least one of the specified level of consistency and the type of filesystem object access that the request involves a remote request from the first cloud controller to at least one of the second cloud controller or the cloud storage system; and sending an interim notification to the client to notify the client that the request is pending, wherein the first cloud controller is configured to send the interim notification to the client before the timeout interval expires to ensure that the client does not abort the request;

wherein sending the interim notification further comprises tracking a set of delays associated with accessing the second cloud controller, determining from the tracked information that the remote request will exceed the client timeout interval, and ensuring that the client receives the interim notification before the timeout interval is exceeded.

12. A cloud controller that sends interim notifications for a namespace operation to a client of a distributed filesystem, comprising:

a processor;

a storage mechanism that stores metadata for the distributed filesystem; and a storage management mechanism;

wherein two or more cloud controllers collectively manage the data of the distributed filesystem;

wherein the cloud controller is configured to receive a request from a client to perform a namespace operation upon a filesystem object, wherein the client is configured to abort the request if the duration of the request exceeds a timeout interval;

wherein the storage management mechanism determines that that the first cloud controller needs to contact at least one of a second, distinct cloud controller or a cloud storage system to service the request by performing actions that comprise:

determining a specified level of consistency associated with the filesystem object and the type of namespace operation being requested by the client for the filesystem object; and determining from at least one of the specified level of consistency and the type of filesystem object access that the request involves a remote request from the cloud controller to at least one of the second cloud controller or the cloud storage system; and wherein the cloud controller sends an interim notification to the client to notify the client that the request is pending, wherein the cloud controller is configured to send the interim notification to the client before the timeout interval expires to ensure that the client does not abort the request;

wherein sending the interim notification further comprises tracking a set of delays associated with accessing the second cloud controller, determining from the tracked information that the remote request will exceed the client timeout interval, and ensuring that the client receives the interim notification before the timeout interval is exceeded.

* * * * *